US012579061B2

(12) United States Patent
Hirano et al.

(10) Patent No.: US 12,579,061 B2
(45) Date of Patent: Mar. 17, 2026

(54) SCAN REGISTER CIRCUIT PERFORMING FAIL BIT COUNT OPERATION OR POSITION SEARCH OPERATION AND MEMORY DEVICE INCLUDING THE SAME

(71) Applicant: Samsung Electronics Co., Ltd., Suwon-si (KR)

(72) Inventors: Makoto Hirano, Suwon-si (KR); Sang Soo Park, Suwon-si (KR); Seoyeon Choi, Suwon-si (KR); Jae-Duk Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/914,961

(22) Filed: Oct. 14, 2024

(65) Prior Publication Data

US 2025/0291715 A1 Sep. 18, 2025

(30) Foreign Application Priority Data

Mar. 15, 2024 (KR) ........................ 10-2024-0036305

(51) Int. Cl.
*G06F 12/00* (2006.01)
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS

| | | | |
|---|---|---|---|
| 7,099,783 B2 | 8/2006 | Hasegawa et al. | |
| 8,086,923 B2 | 12/2011 | Cheng et al. | |
| 8,427,884 B2 | 4/2013 | Liu et al. | |
| 8,984,354 B2 | 3/2015 | Kuo et al. | |
| 10,297,337 B2 | 5/2019 | Tsai et al. | |
| 11,437,116 B2 | 9/2022 | Mohr et al. | |
| 2003/0229886 A1 | 12/2003 | Hasegawa et al. | |
| 2007/0150777 A1* | 6/2007 | Sasaki .................... | G11C 29/44 |
| | | | 714/718 |
| 2009/0254786 A1 | 10/2009 | Cheng et al. | |
| 2012/0304032 A1 | 11/2012 | Kuo et al. | |
| 2012/0321032 A1 | 12/2012 | Liu et al. | |
| 2019/0043603 A1* | 2/2019 | Tsai ....................... | H03K 23/40 |
| 2020/0211670 A1* | 7/2020 | Chen ..................... | G11C 16/10 |
| 2020/0243155 A1 | 7/2020 | Mohr et al. | |
| 2020/0395085 A1* | 12/2020 | Nakayama ............. | G11C 29/44 |
| 2023/0258715 A1 | 8/2023 | Whetsel | |

* cited by examiner

*Primary Examiner* — Daniel D Tsui
(74) *Attorney, Agent, or Firm* — Morgan, Lewis & Bockius LLP

(57) ABSTRACT

A memory device includes a memory cell array configured to store data, a page buffer circuit configured to store data in the memory cell array or read data stored in the memory cell array, and a scan register circuit configured to receive a pass/fail result of data from the page buffer circuit and store the pass/fail result in a plurality of scan registers. The scan register circuit obtains information about the scan register where the fail result is stored through a scan operation, and uses the information about the scan register where the fail result is stored to determine the number of fail bits and/or a position index indicating the position of the fail bits according to the operation mode.

20 Claims, 28 Drawing Sheets

FIG.9

| Operation Mode | MODE | DUMP |
| --- | --- | --- |
| Fail Bit Count | 1 | 0 |
| Position Search | 0 | 1 |

FIG.18

| 16x4 Encoder(2412) | |
| --- | --- |
| SCO[15:0] | PI1[3:0] |
| 0000 0000 0000 0001 | 0000 |
| 0000 0000 0000 0010 | 0001 |
| 0000 0000 0000 0100 | 0010 |
| 0000 0000 0000 1000 | 0011 |
| 0000 0000 0001 0000 | 0100 |
| 0000 0000 0010 0000 | 0101 |
| 0000 0000 0100 0000 | 0110 |
| 0000 0000 1000 0000 | 0111 |
| 0000 0001 0000 0000 | 1000 |
| 0000 0010 0000 0000 | 1001 |
| 0000 0100 0000 0000 | 1010 |
| 0000 1000 0000 0000 | 1011 |
| 0001 0000 0000 0000 | 1100 |
| 0010 0000 0000 0000 | 1101 |
| 0100 0000 0000 0000 | 1110 |
| 1000 0000 0000 0000 | 1111 |

FIG.19

| 8x3 Encoder (2422) | |
|---|---|
| SRP[7:0] | PI2[2:0] |
| 0 0 0 0 0 0 0 1 | 0 0 0 |
| 0 0 0 0 0 0 1 0 | 0 0 1 |
| 0 0 0 0 0 1 0 0 | 0 1 0 |
| 0 0 0 0 1 0 0 0 | 0 1 1 |
| 0 0 0 1 0 0 0 0 | 1 0 0 |
| 0 0 1 0 0 0 0 0 | 1 0 1 |
| 0 1 0 0 0 0 0 0 | 1 1 0 |
| 1 0 0 0 0 0 0 0 | 1 1 1 |

SCAN REGISTER CIRCUIT PERFORMING FAIL BIT COUNT OPERATION OR POSITION SEARCH OPERATION AND MEMORY DEVICE INCLUDING THE SAME

CROSS-REFERENCE TO RELATED APPLICATIONS

This application claims priority under 35 U.S.C. § 119 to Korean Patent Application No. 10-2024-0036305 filed on Mar. 15, 2024, in the Korean Intellectual Property Office, the disclosures of which are incorporated by reference herein in their entireties.

BACKGROUND

Example embodiments of the present disclosure described herein relate to a semiconductor memory device, and more particularly, relate to a scan register circuit that performs a fail bit count operation or a position search operation depending on the operation mode, and a memory device including the same.

Semiconductor memories may be classified as a volatile memory or a non-volatile memory, for example. Typically, the volatile memories (e.g., a dynamic random access memory (DRAM) or a static random access memory (SRAM)) may exhibit faster read and/or write speeds when compared to the non-volatile memory. However, data stored in the volatile memory may disappear when a power applied to the volatile memory is turned off. In contrast, the non-volatile memory may retain the data even when the power is turned off.

A representative example of the non-volatile memory may be a flash memory. The flash memory may be used as a storage device for electronic devices such as, but not limited to, computers, smart phones, digital cameras and the like. The flash memory may store multi-bit data of two or more bits in one memory cell. The flash memory may have at least one erase state and a plurality of program (e.g., writing) states depending on threshold voltage distributions.

The flash memory may include a page buffer circuit for storing data in a memory cell array or reading data stored in the memory cell array. The flash memory may obtain pass/fail results of data from the page buffer circuit and correct errors caused by fail bits. The flash memory needs to accurately determine the number and position of fail bits to effectively correct errors caused by fail bits.

SUMMARY

Example embodiments of the present disclosure provide a scan register circuit that performs a fail bit count operation or a position search operation depending on the operation mode, and a memory device including the same.

According to an embodiment, a memory device comprises: a memory cell array configured to store data; a page buffer circuit configured to store data in the memory cell array or read data stored in the memory cell array; and a scan register circuit configured to receive a pass/fail result of data from the page buffer circuit and store the pass/fail result in a plurality of scan registers. The scan register circuit obtains information about a scan register among the plurality of scan registers where the fail result is stored through a scan operation, and uses the information about the scan register where the fail result is stored to determine the number of fail bits and/or a position index indicating the position of the fail bits according to the operation mode.

According to an embodiment, a scan register circuit of a memory device comprises: a scan register array configured to have a plurality of scan chain units, each scan chain unit having a plurality of scan registers, each scan register storing a pass/fail result of data; and a fail bit output circuit configured to determine the number of fail bits and/or a position index indicating the position of the fail bits depending on the operation mode. The fail bit output circuit obtains information of a scan register among the plurality of scan registers where the fail result is stored through a scan operation of the plurality of scan registers, and determines the number of fail bits or the position index using the information of the scan register where the fail result is stored.

According to an embodiment, a scan register circuit of a memory device comprises: a scan register array configured to have a plurality of scan chain units, each scan chain unit having a plurality of scan registers, each scan register storing a pass/fail result of data; a bit counter configured to receive the scan chain output signal of each scan chain unit in the fail bit count mode and determine the number of fail bits; and a position finder configured to receive the scan chain output signal and the scan register output signal of each scan chain unit in the position search mode and determine a position index indicating the position of the fail bit.

BRIEF DESCRIPTION OF THE FIGURES

The above and other objects and features of the present disclosure will become apparent by describing in detail embodiments thereof with reference to the accompanying drawings.

FIG. 9 is a diagram for explaining the operation mode of the scan register circuit shown in FIG. 6.

FIGS. 18 and 19 are tables for explaining the operation of the 16×4 encoder and 8×3 encoder shown in FIG. 17.

DETAILED DESCRIPTION

Below, example embodiments of the present disclosure will be described in detail and clearly to such an extent that one of ordinary skill in the art can easily implement the inventive concepts.

Figure 1:
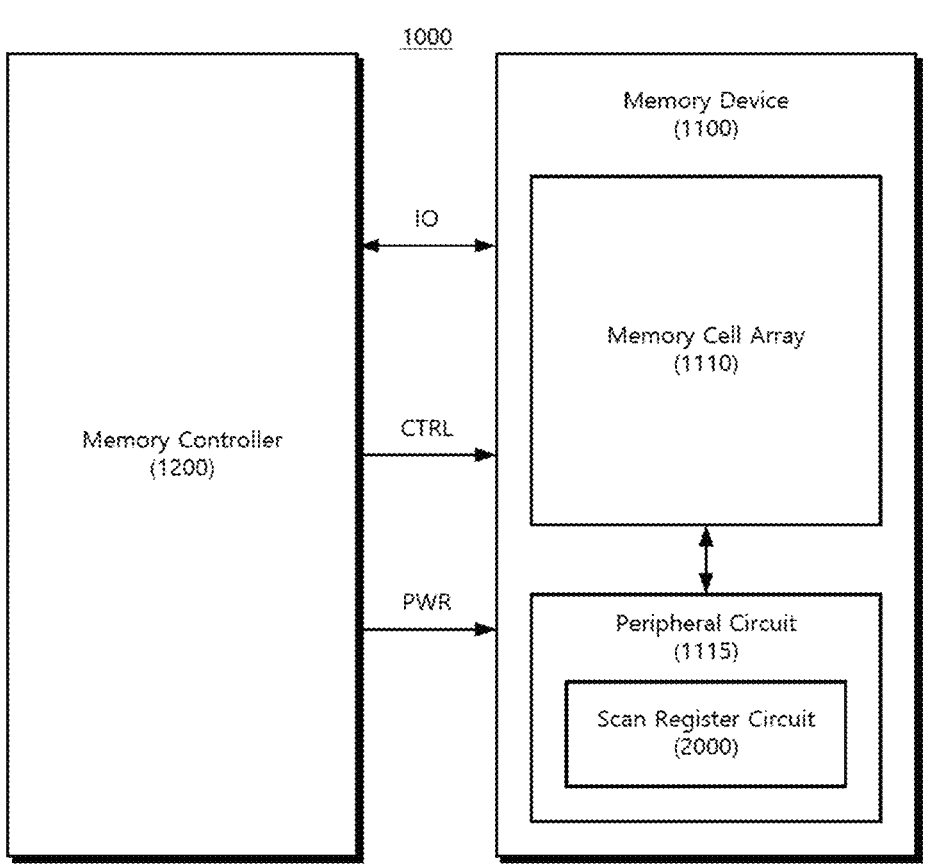
FIG. 1 is a block diagram illustrating an example embodiment of a storage device according to the present disclosure.

FIG. 1 is a block diagram illustrating an example embodiment of a storage device according to the present disclosure. The storage device 1000 may be a flash storage device based on a flash memory. For example, the storage device 1000 may be implemented as a solid-state drive (SSD), a universal flash storage (UFS), a memory card, or the like.

Referring to FIG. 1, the storage device 1000 may include a memory device 1100 and a memory controller 1200. The memory device 1100 may receive input/output signals IO from the memory controller 1200 through input/output lines, receive control signals CTRL through control lines, and receive external power supply PWR through power lines. The storage device 1000 may store data in the memory device 1100 under the control of the memory controller 1200.

The memory device 1100 may include a memory cell array 1110 and a peripheral circuit 1115. The memory cell array 1110 may have a vertical 3D structure. The memory cell array 1110 may include a plurality of memory cells. Multi-bit data may be stored in each memory cell.

The memory cell array 1110 may be located (e.g., disposed) next to or above the peripheral circuit 1115 in terms of the design layout structure. A structure in which the memory cell array 1110 is positioned over the peripheral circuit 1115 may be referred to as a cell on peripheral (COP) structure.

The memory cell array 1110 may be manufactured as a chip separate from the peripheral circuit 1115. An upper chip including the memory cell array 1110 and a lower chip including the peripheral circuit 1115 may be connected to each other by a bonding method. Such a structure may be referred to as a chip-to-chip (C2C) structure.

The peripheral circuit 1115 may include analog circuits and/or digital circuits required to store data in the memory cell array 1110 or read data stored in the memory cell array 1110. The peripheral circuit 1115 may receive external power PWR through power lines and generate internal powers of various levels.

The peripheral circuit 1115 may receive commands, addresses, and/or data from the memory controller 1200 through input/output lines. The peripheral circuit 1115 may store data in the memory cell array 1110 according to the control signals CTRL. Alternatively or additionally, the peripheral circuit 1115 may read data stored in the memory cell array 1110 and provide the read data to the memory controller 1200.

The peripheral circuit 1115 may include a scan register circuit 2000. The scan register circuit 2000 may have a fail bit count mode and a position search mode. The scan register circuit 2000 may have a plurality of scan chain units, and each scan chain unit may have a plurality of scan registers. The pass/fail result of data stored in the memory cell array 1110 may be stored in each scan register. The scan register circuit 2000 may determine the number and position of fail bits through a fail bit count mode and/or a position search mode.

Figure 2:
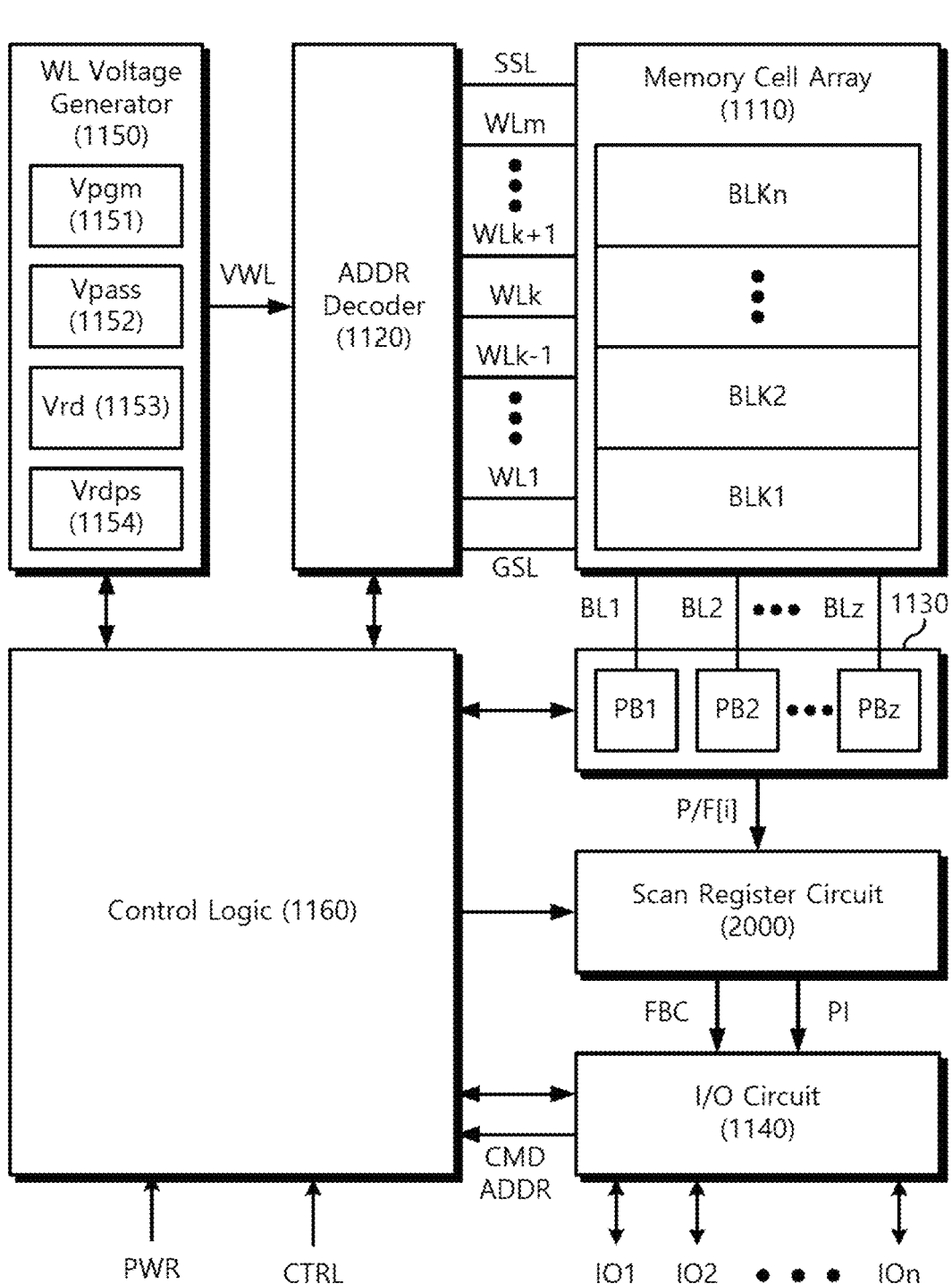
FIG. 2 is a block diagram illustrating as an example embodiment of the memory device illustrated in FIG. 1.

FIG. 2 is a block diagram illustrating as an example embodiment of the memory device illustrated in FIG. 1. Referring to FIG. 2, the memory device 1100 may include the memory cell array 1110 and the peripheral circuit 1115 (see FIG. 1). The peripheral circuit 1115 may include an address decoder 1120, a page buffer circuit 1130, a data input/output circuit 1140, a word line voltage generator 1150, and a control logic 1160.

The memory cell array 1110 may include a plurality of memory blocks BLK1 to BLKn. Each memory block may include a plurality of pages. Each page may include a plurality of memory cells. Each memory cell may store multi-bit data (e.g., two or more bits). Each memory block may correspond to an erase unit, and each page may correspond to a read and/or write unit.

The memory cell array 1110 may be formed in a direction perpendicular to a substrate. A gate electrode layer and an insulation layer may be alternately deposited on the substrate. Each memory block (e.g., BLK1) may be connected to one or more string selection lines SSL, a plurality of word lines WL1 to WLm, and one or more ground selection lines GSL. WLk is a selected word line sWL and the remaining word lines (WL1 to WLk−1, WLk+1 to WLm) are unselected word lines uWL.

The address decoder 1120 may be connected to the memory cell array 1110 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

The page buffer circuit 1130 may be connected to the memory cell array 1110 through bit lines BL1 to BLz. The page buffer circuit 1130 may temporarily store data to be stored in the memory cell array 1110 or data read from the memory cell array 1110. The page buffer circuit 1130 may include page buffers PB1 to PBz connected to respective bit lines. Each page buffer may include a plurality of latches to store or read multi-bit data.

The input/output circuit 1140 may be internally connected to the page buffer circuit 1130 through data lines and externally connected to the memory controller 1200 (refer to FIG. 1) through the input/output lines IO1 to IOn. The input/output circuit 1140 may receive program data from the memory controller 1200 during a program operation. Also, the input/output circuit 1140 may provide data read from the memory cell array 1110 to the memory controller 1200 during a read operation.

The word line voltage generator 1150 may receive internal power from the control logic 1160 and generate a word line voltage VWL required to read or write data. The word line voltage VWL may be provided to a selected word line sWL or unselected word lines uWL through the address decoder 1120.

The word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

The word line voltage generator 1150 may include a read voltage generator 1153 and a read pass voltage generator 1154. The read voltage generator 1153 may generate a select read voltage Vrd provided to the select word line sWL during a read operation. The read pass voltage generator 1154 may generate a read pass voltage Vrdps provided to unselected word lines uWL. The read pass voltage Vrdps may be a voltage sufficient to turn on memory cells connected to the unselected word lines uWL during a read operation.

The control logic 1160 may control operations such as read, write, and erase of the memory device 1100 using commands CMD, addresses ADDR, and control signals CTRL provided from the memory controller 1200. The addresses ADDR may include a block selection address for selecting one memory block, a row address for selecting one page, and a column address for selecting one memory cell.

The scan register circuit 2000 may receive a pass/fail result P/F[i] from the page buffer circuit 1130 and output a fail bit count signal (FBC) and/or a position index signal (PI). The memory device 1100 according to an embodiment of the present disclosure may determine the number and position of fail bits using the scan register circuit 2000.

Figure 3:
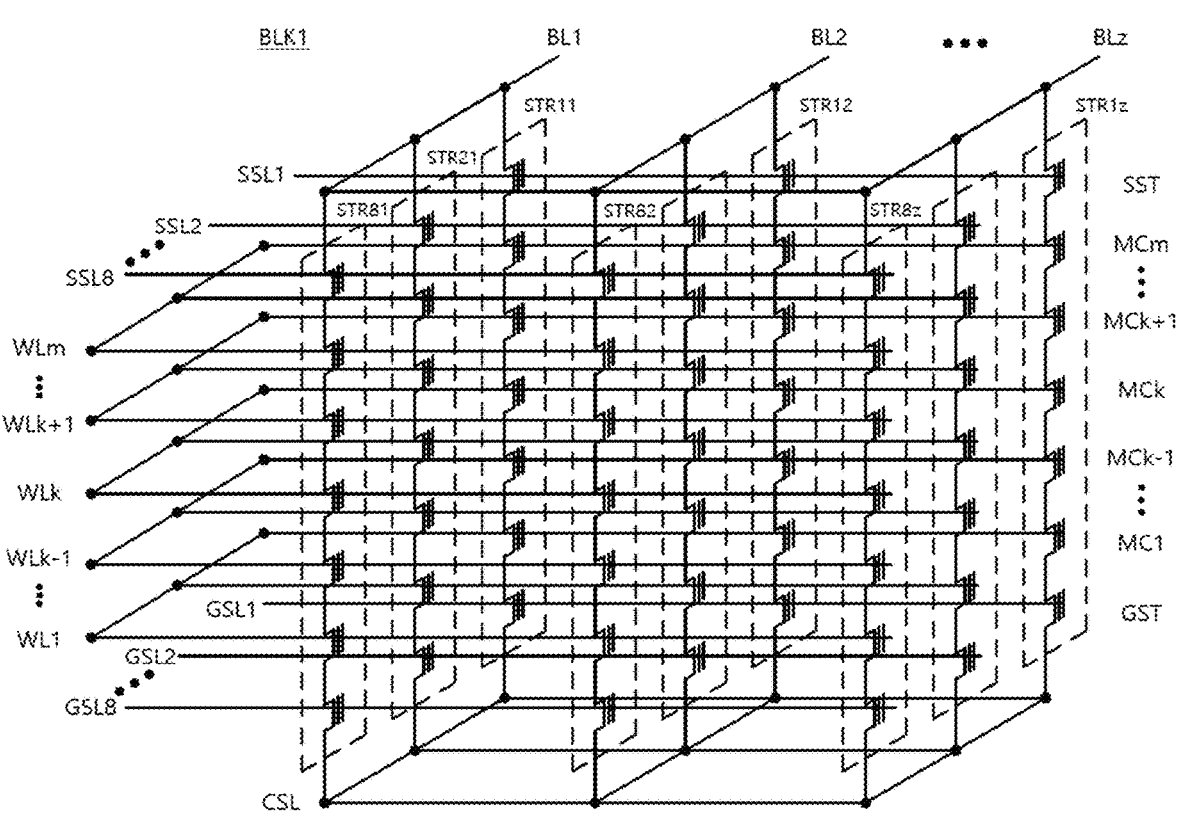
FIG. 3 is a circuit diagram illustrating an example embodiment of a memory block BLK1 of the memory cell array illustrated in FIG. 2.

FIG. 3 is a circuit diagram illustrating an example embodiment of a memory block BLK1 of the memory cell array illustrated in FIG. 2. Referring to FIG. 3, in the memory block BLK1, a plurality of cell strings STR11 to STR8$z$ may be formed between the bit lines BL1 to BLz and a common source line CSL. Each cell string includes a string selection transistor SST, a plurality of memory cells MC1 to MCm, and a ground selection transistor GST.

The string selection transistors SST may be connected with string selection lines SSL1 to SSL8. The ground selection transistors GST may be connected with ground selection lines GSL1 to GSL8. The string selection transistors SST may be connected with the bit lines BL1 to BLz, and the ground selection transistors GST may be connected with the common source line CSL.

The first to m-th word lines WL1 to WLm may be connected with the plurality of memory cells MC1 to MCm in a row direction. The first to z-th bit lines BL1 to BLz may be connected with the plurality of memory cells MC1 to MCm in a column direction. First to z-th page buffers PB1 to PBz may be connected with the first to z-th bit lines BL1 to BLz.

The first word line WL1 may be placed above the first to eighth ground selection lines GSL1 to GSL8. The first memory cells MC1 that are placed at the same height from the substrate may be connected with the first word line WL1. The m-th word line WLm may be located below the first to eighth string selection lines SSL1 to SSL8. The m-th memory cells MCm located at the same height from the substrate may be connected to the m-th word line WLm. The second to (m−1)-th memory cells MC2 to MCm-1 that are placed at the same heights from the substrate may be respectively connected with the second to (m−1)-th word lines WL2 to WLm-1, respectively.

Figure 4:
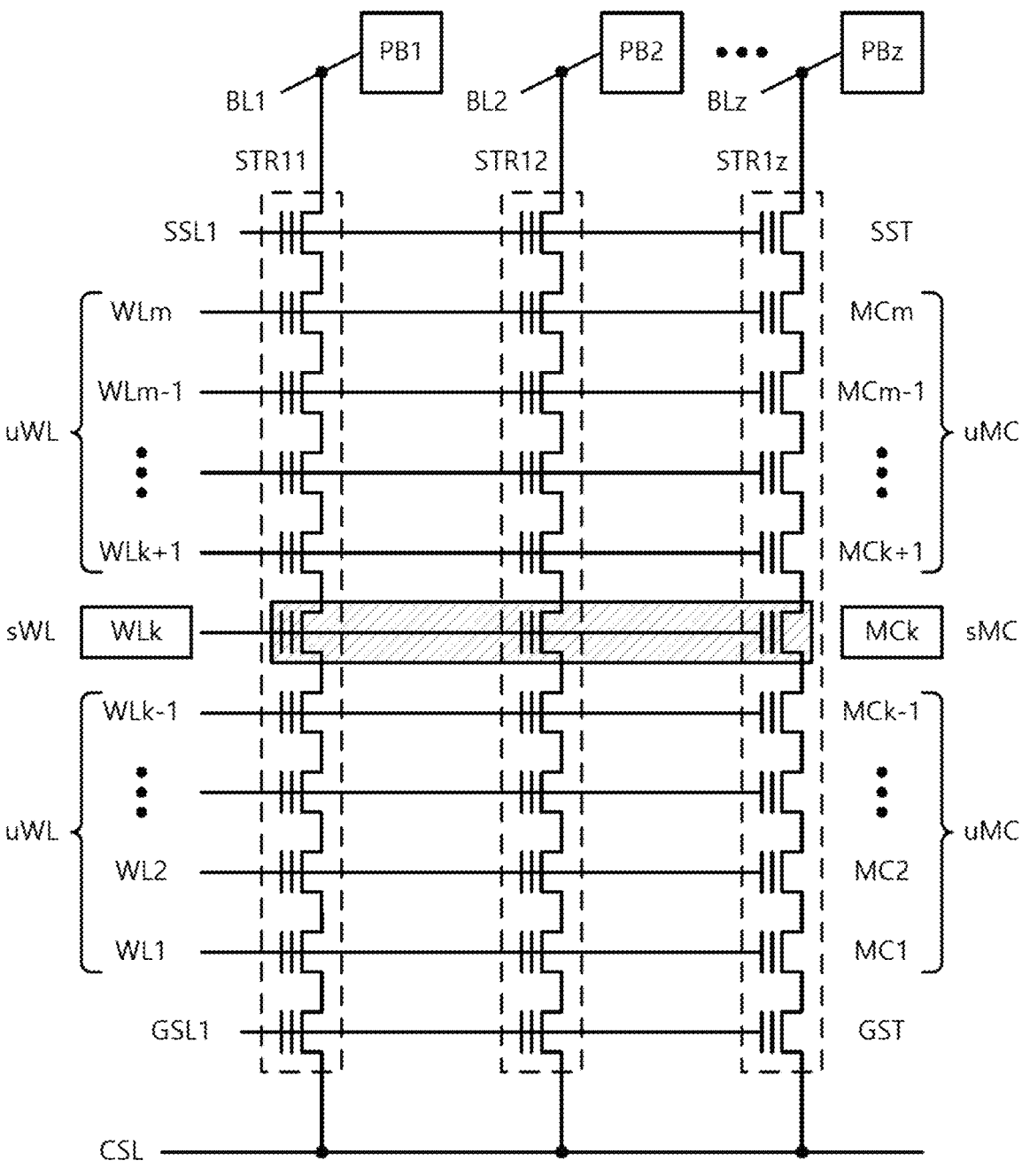
FIG. 4 is a circuit diagram illustrating cell strings selected by the first string selection line SSL1 from among the cell strings of the memory block BLK1 illustrated in FIG. 3.

FIG. 4 is a circuit diagram illustrating cell strings selected by the first string selection line SSL1 from among the cell strings of the memory block BLK1 illustrated in FIG. 3.

The 11th to 1z cell strings STR11 to STR1$z$ may be selected by the first string selection line SSL1. The 11th to 1zth cell strings STR11 to STR1$z$ may be connected to the first to z-th bit lines BL1 to BLz, respectively. The first to z-th page buffers PB1 to PBz may be connected to the first to z-th bit lines BL1 to BLZ, respectively.

The 11th cell string STR11 may be connected to the first bit line BL1 and the common source line CSL. The 11th cell string STR11 may include string selection transistors SST selected by the first string selection line SSL1, first to m-th memory cells MC1 to MCm connected to the first to m-th word lines WL1 to WLm, and ground selection transistors GST selected by the first ground selection line GSL1. The 12th cell string STR12 may be connected to the second bit line BL2 and the common source line CSL. The 1zth cell string STR1$z$ may be connected to the z-th bit line BLz and the common source line CSL.

The first word line WL1 and the m-th word line WLm may be edge word lines (edge WL). The second word line WL2 and the (m−1)-th word line WLm-1 may be edge adjacent word lines. The k-th word line WLk may be a selected word line SWL. The (k−1)-th word line WLk−1 and the (k+1)-th word line WLk+1 may be adjacent word lines adjacent to the selected word line. If the k-th word line WLk is the selected word line sWL, the remaining word lines WL1 to WLk−1 and WLk+1 to WLm may be unselected word lines uWL.

The first memory cells MC1 and the m-th memory cells MCm may be edge memory cells. The second memory cells MC2 and the (m−1)-th memory cells MCm-1 may be edge adjacent memory cells. The k-th memory cells MCk may be selected memory cells sMC. The (k−1)-th memory cells MCk−1 and the (k+1)-th memory cells MCk+1 may be memory cells adjacent to the selected memory cells (adjacent MC). If the k-th memory cells MCK are selected memory cells sMC, the remaining memory cells MC1 to MCk−1 and MCk+1 to MCm may be unselected memory cells uMC.

A set of memory cells selected by one string selection line and connected to one word line may be one page. For example, memory cells selected by the first string selection line SSL1 and connected to the k-th word line WLk may be one page. For example, eight pages may be configured on the k-th word line WLk. Among the eight pages, a page connected to the first string selection line SSL1 is a selected page, and pages connected to the second to eighth string selection lines SSL2 to SSL8 are unselected pages.

The first word line WL1 is a first edge word line (Edge1 WL), and the second word line WL2 is a first edge adjacent word line (Edge1 adjacent WL). The m-th word line WLm is the second edge word line (Edge2 WL), and the (m−1)-th word line WLm-1 is the second edge adjacent word line (Edge2 adjacent WL). And word lines between the first and second edge adjacent word lines are middle word lines. For example, the k-th word line WLk (k=3 to m−2) between the second word line WL2 and the (m−1)-th word line WLm-1 is a middle word line.

In the read operation, if the second word line WL2 is the selected word line sWL, the remaining word lines may be unselected word lines uWL. The second word line WL2 may be a first edge adjacent word line (Edge1 adjacent WL). The second memory cells MC2 may be selected memory cells sMC. The remaining memory cells may be unselected memory cells uMC.

If the (m–1)-th word line WLm-1 is the selected word line sWL, the remaining word lines may be unselected word lines uWL. The (m–1)-th word line WLm-1 may be a second edge adjacent word line. The (m–1)-th memory cells MCm-1 may be selected memory cells sMC. The remaining memory cells may be unselected memory cells uMC.

Figure 5:
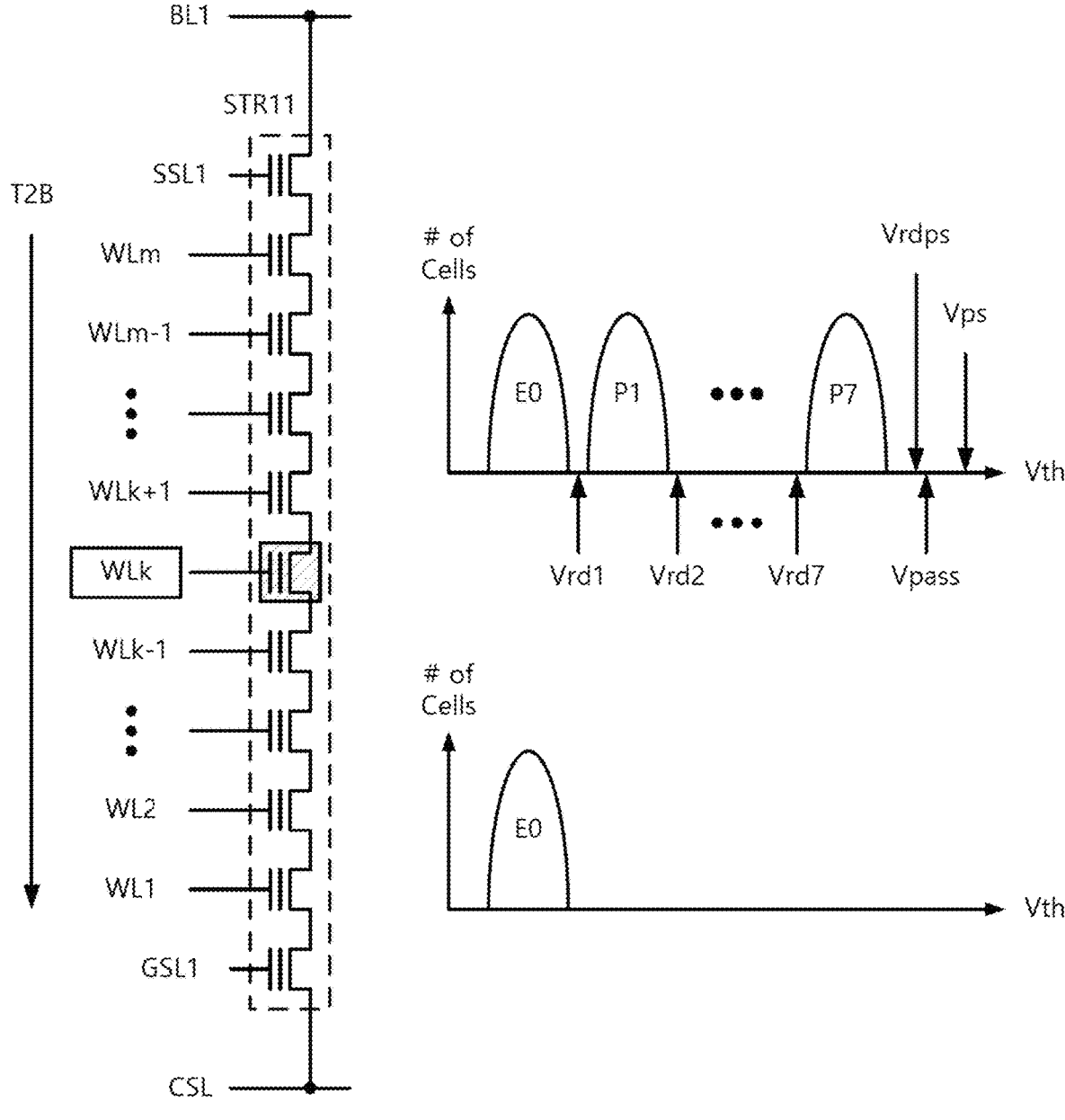
FIG. 5 is a diagram illustrating an example embodiment of threshold voltage distributions of memory cells illustrated in FIG. 4.

FIG. 5 is a diagram illustrating an example embodiment of threshold voltage distributions of memory cells illustrated in FIG. 4. The horizontal axis represents the threshold voltage Vth, and the vertical axis represents the number of memory cells.

FIG. 5 shows an example in which 3-bit data is stored in one memory cell. A 3-bit memory cell may have one of eight states (E0, P1 to P7) according to the threshold voltage distribution. E0 represents an erase state, and P1 to P7 represent program states.

During a read operation, the selection read voltages Vrd1 to Vrd7 may be provided to the selected word line sWL, and the pass voltage Vps and/or the read pass voltage Vrdps may be provided to the unselected word lines uWL. The pass voltage Vps and/or the read pass voltage Vrdps may be a voltage sufficient to turn on the memory cells. For example, the pass voltage Vps may be provided to the adjacent word lines WLk±1, and the read pass voltage Vrdps may be provided to the unselected word lines other than the adjacent word lines.

The first selection read voltage Vrd1 may be a voltage level between the erase state E0 and the first program state P1. The second selection read voltage Vrd2 may be a voltage level between the first and second program states P1 and P2. In this way, the seventh selection read voltage Vrd7 may be a voltage level between the sixth and seventh program states P6 and P7.

When the first selection read voltage Vrd1 is applied, the memory cell in the erase state E0 may be an on cell and the memory cell in the first to seventh program states P1 to P7 may be an off cell. When the second selection read voltage Vrd2 is applied, the memory cell in the erase state E0 and the first program state P1 may be an ON cell, and the memory cell in the second to seventh program states P2 to P7 may be an OFF cell. In this way, when the seventh selection read voltage Vrd7 is applied, the memory cell in the erase state E0 and the first to sixth program states P1 to P6 may be an ON cell and the memory cell in the seventh program state P7 may be an OFF cell.

During a read operation, the k-th word line WLk may be selected. A power supply voltage may be applied to the string selection line SSL1 and the ground selection line GSL1, and the string select transistor SST and the ground select transistor GST may be turned on. Also, the selection read voltage Vrd may be provided to the selected word line sWL, and the read pass voltage Vrdps and/or the pass voltage Vps may be provided to the unselected word lines uWL.

When the read operation of the k-th word line WLk is repeatedly performed, the high voltage read pass voltage Vrdps may be repeatedly provided to the remaining word lines. At this time, a read disturbance may occur in the remaining word lines, and thus the threshold voltage may be distorted. Memory cells connected to the k-th word line WLk may be OFF cells when a selection read voltage is provided. That is, when the threshold voltage of the k-th memory cell is higher than the selection read voltage, the k-th memory cell may be an OFF cell. When the k-th memory cell is an OFF cell, a channel may be separated at the k-th memory cell. That is, a lower channel of the k-th memory cell may receive a ground voltage from the common source line CSL, and an upper channel of the k-th memory cell may have a negative channel voltage.

A channel voltage difference may occur between a lower channel and an upper channel with the k-th memory cell interposed therebetween. Due to the channel voltage difference, hot carrier injection (HCI) may occur in an adjacent memory cells MCk+1 and/or MCk–1. For this reason, threshold voltages of memory cells connected to adjacent word lines WLk+1 and/or WLk–1 may be distorted. For example, the threshold voltages of memory cells in the erased state E0 may rise to enter the programmed state.

Figure 6:
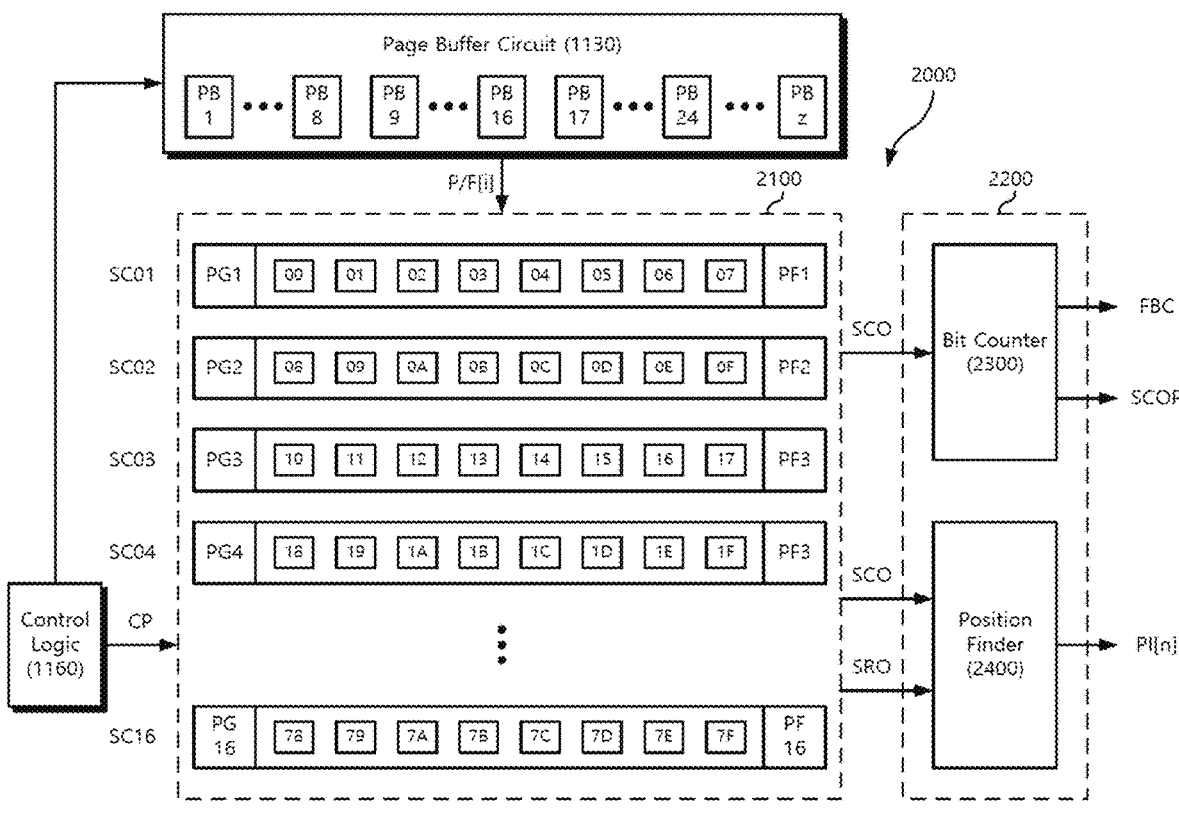
FIG. 6 is a block diagram illustrating an example embodiment of the scan register circuit shown in FIG. 2.

FIG. 6 is a block diagram illustrating an example embodiment of the scan register circuit shown in FIG. 2. Referring to FIG. 6, the scan register circuit 2000 may include a scan register array 2100 and a fail bit output circuit 2200. The fail bit output circuit 2200 may include a bit counter 2300 and a position finder 2400.

The scan register array 2100 may include a plurality of scan chain units. For example, the scan register array 2100 may include first to sixteenth scan chain units SC01 to SC16. Each scan chain unit may include a pulse gate PG, scan registers, and a priority filter PF.

For example, the first scan chain unit SC01 may include a first pulse gate PG1, first scan registers 00 to 07, and a first priority filter PF1. The second scan chain unit SC02 may include a second pulse gate PG2, second scan registers 08 to 0F, and a second priority filter PF2. As such, the 16th scan chain unit SC16 may include a 16th pulse gate PG16, 16th scan registers 78 to 7F, and a 16th priority filter PF16.

Each scan chain unit may have the same or similar internal configuration and operating principle. Hereinafter, the internal configuration and operating principle of the first scan chain unit SC01 will be described. The first pulse gate PG1 of the first scan chain unit SC01 may receive a clear pulse CP from the control logic 1160 and provide a clock signal to the first scan registers 00 to 07.

The pass/fail result P/F[i] for the data of the page buffers may be input to the first scan registers 00 to 07. For example, the pass/fail result for the data of the first to eighth page buffers PB1 to PB8 may be input to the first scan registers 00 to 07 of the first scan chain unit SC01. The pass/fail result P/F[1] for the data of the first page buffer PB1 may be input to the scan register 00.

The pass/fail result for the data of the 9th to 16th page buffers PB9 to PB16 may be input to the second scan registers 08 to 0F of the second scan chain unit SC02. The pass/fail result for the data of the 17th to 24th page buffers PB17 to PB24 may be input to the third scan registers 10 to 17 of the third scan chain unit SC03. In this way, the pass/fail result may also be input to the scan registers of the 16th scan chain unit SC16.

The bit counter 2300 may receive a scan chain output signal SCO from the first to sixteenth scan chain units SC01 to SC16 and determine a fail bit count FBC. Additionally, the bit counter 2300 may receive a scan chain output signal SCO from the first to sixteenth scan chain units SC01 to SC16 and output a SCO pass signal SCOP.

The position finder 2400 may receive a scan chain output signal SCO and a scan register output signal SRO from the first to sixteenth scan chain units SC01 to SC16. The position finder 2400 may detect the position of the fail bit and output a position index signal PI[n].

The scan register circuit of the memory device according to an example embodiment of the present disclosure may include a scan register array 2100 and a fail bit output circuit 2200. The scan register array 2100 may have a plurality of scan chain units, each scan chain unit may have a plurality of scan registers, and each scan register may store a pass/fail result of data. The fail bit output circuit 2200 may obtain information on the scan register where the fail result is stored through a scan operation of a plurality of scan registers. And the fail bit output circuit 2200 may determine the number of fail bits according to the operation mode using the information on the scan register where the fail result is stored. A position index indicating the location of the fail bit may be determined.

Figure 7:
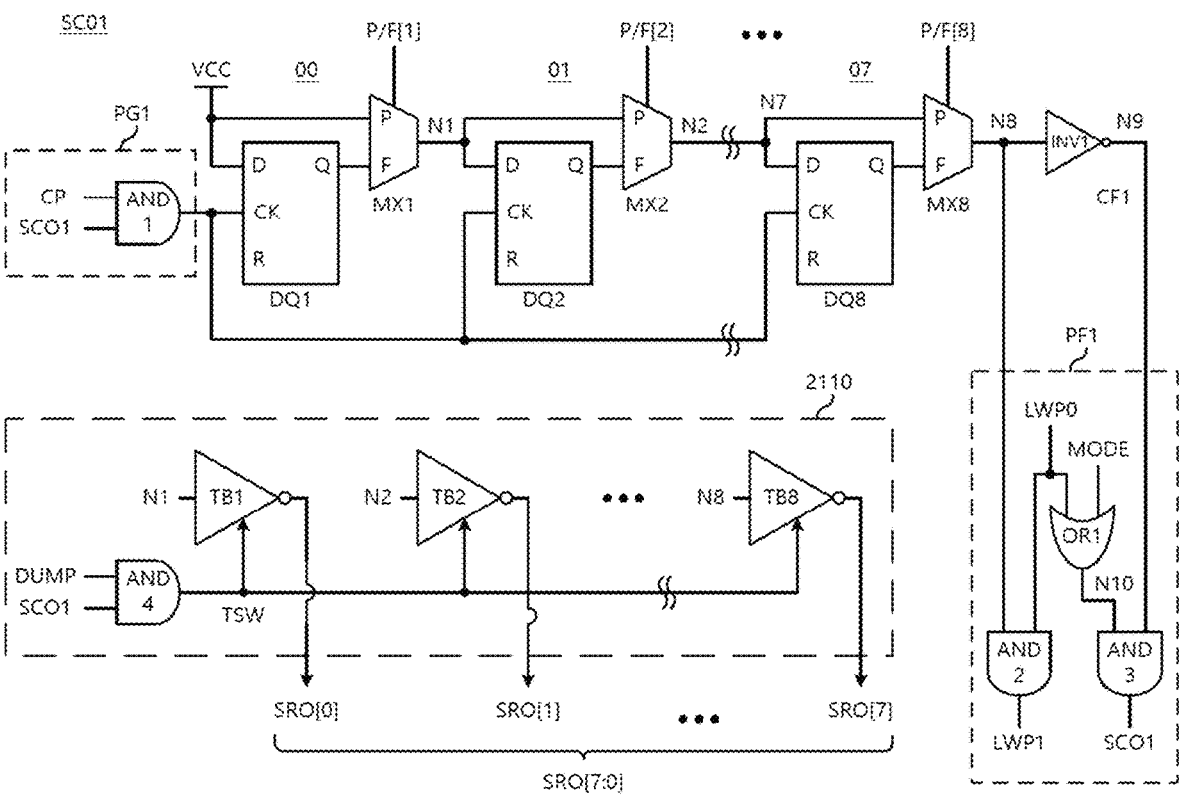
FIGS. 7 and 8 are circuit diagrams illustrating example embodiments of the first scan chain unit shown in FIG. 6.
Figure 8:
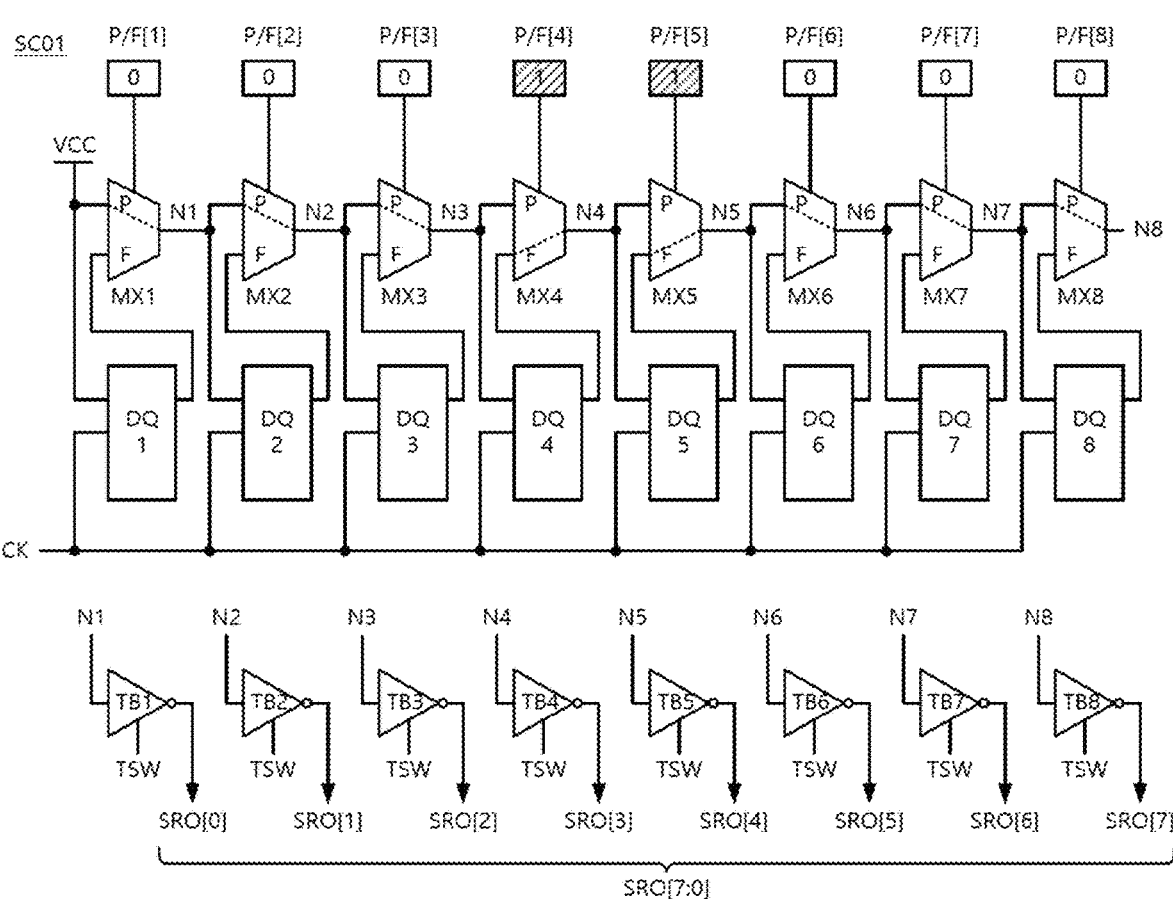

FIGS. 7 and 8 are circuit diagrams illustrating example embodiments of the first scan chain unit shown in FIG. 6. Referring to FIGS. 7 and 8, the first scan chain unit SC01 may include a first pulse gate PG1, first scan registers 00 to 07, a first priority filter PF1, and a scan register output circuit 2110.

The first pulse gate PG1 may receive the clear pulse CP and the first scan chain output signal SCO1 and perform AND logic operation. For example, the first pulse gate PG1 may include a first AND gate AND1. The first AND gate AND1 may receive a clear pulse CP and a first scan chain output signal SCO1 and generate a clock signal. The clock signal may be provided to first scan registers 00 to 07.

The scan register 00 may include a first DQ flip-flop DQ1 and a first multiplexer MX1. The first DQ flip-flop DQ1 may include a D terminal, a CK terminal, an R terminal, and a Q terminal. The D terminal may be connected to the power terminal, and the CK terminal may be connected to the output terminal of the first pulse gate PG1. The first DQ flip-flop DQ1 may receive a power supply voltage VCC through the D terminal, a clock signal through the CK terminal, and a reset signal through the R terminal. The first DQ flip-flop DQ1 may output an output signal through the Q terminal.

The first multiplexer MX1 may include a P terminal and an F terminal. The P terminal may be connected to the power terminal, and the F terminal may be connected to the Q terminal of the first DQ flip-flop DQ1. The first multiplexer MX1 may receive the first pass/fail result P/F[1], select one of the P terminal and the F terminal, and connect it to the first node N1. For example, if the first pass/fail result P/F[1] is a pass, the P terminal may be connected to the first node N1. And if the first pass/fail result P/F[1] is a fail, the F terminal may be connected to the first node N1.

The 01 scan register may include a second DQ flip-flop DQ2 and a second multiplexer MX2. The D terminal of the second DQ flip-flop DQ2 may be connected to the first node N1. The second DQ flip-flop DQ2 may receive a clock signal through the CK terminal and a reset signal through the R terminal. The second DQ flip-flop DQ2 may output an output signal through the Q terminal.

The P terminal of the second multiplexer MX2 may be connected to the first node N1, and the F terminal may be connected to the Q terminal of the second DQ flip-flop DQ2. The second multiplexer MX2 may receive the second pass/fail result P/F[2], select one of the P terminal and the F terminal, and connect it to the second node N2. For example, if the second pass/fail result P/F[2] is a pass, the P terminal may be connected to the second node N2. And if the second pass/fail result P/F[2] is a fail, the F terminal may be connected to the second node N2.

The scan register 07 may include an eighth DQ flip-flop DQ8 and an eighth multiplexer MX8. The D terminal of the eighth DQ flip-flop DQ8 may be connected to the seventh node N7. The eighth DQ flip-flop DQ8 may receive a clock signal through the CK terminal and a reset signal through the R terminal. The eighth DQ flip-flop DQ8 may output an output signal through the Q terminal.

The P terminal of the eighth multiplexer MX8 may be connected to the seventh node N7, and the F terminal may be connected to the Q terminal of the eighth DQ flip-flop DQ8. The eighth multiplexer MX8 may receive the eighth pass/fail result P/F[8], select one of the P terminal and the F terminal, and connect it to the eighth node N8. For example, if the eighth pass/fail result P/F[8] is a pass, the P terminal may be connected to the eighth node N8. And if the eighth pass/fail result P/F[8] is a fail, the F terminal may be connected to the eighth node N8.

The first scan chain unit SC01 may include a first inverter INV1 between the eighth node N8 and the ninth node N9. The first inverter INV1 may invert the result of the eighth node N8 and output the first chain fail signal CF1.

The first priority filter PF1 may include a plurality of logical operation circuits. For example, the first priority filter PF1 may include a first OR gate OR1, a second AND gate AND2, and a third AND gate AND3. The first OR gate OR1 may receive the default low priority parameter LWP0 and the mode signal MODE as input, and provide the OR operation result to the tenth node N10.

One of the input terminals of the second AND gate AND2 may be connected to the eighth node N8, and the other may receive the default low priority parameter LWP0 and output the first low priority parameter LWP1. One of the input terminals of the third AND gate AND3 may receive the first chain fail signal CF1 through the ninth node N9, and the other may be connected to the tenth node N10. The third AND gate AND3 may output the first scan chain output signal SCO1.

The scan register output circuit 2110 may include an AND logic operation circuit and a plurality of selection circuits. Here, the selection circuits may be tri-state buffers that can selectively output according to a switch control signal. For example, the scan register output circuit 2110 may include a fourth AND gate AND4 and first to eighth tri-state buffers TB1 to TB8. The fourth AND gate AND4 may receive the dump signal DUMP and the first scan chain output signal SCO1 and provide a tri-state switch signal TSW to the first to eighth tri-state buffers TB1 to TB8.

The first to eighth tri-state buffers TB1 to TB8 may each have three output states. For example, each tri-state buffer may output logic 1, logic 0, and high resistance (z) according to the tri-state switch signal TSW. If the tri-state switch signal TSW is 0, high resistance (z) may be output regardless of the input. If the tri-state switch signal TSW is 1, the inverted signal of the input signal may be output. The first to eighth tri-state buffers TB1 to TB8 may output SRO[7:0].

Each scan chain unit according to an example embodiment of the present disclosure may include a pulse gate that receives a clear pulse CP and outputs a clock signal, a plurality of scan registers that perform a scan chain operation in response to the clock signal of the pulse gate, and a priority filter that receives scan chain operation results from a plurality of scan registers and outputs a scan chain output signal.

FIG. 9 is a diagram for explaining the operation mode of the scan register circuit shown in FIG. 6. Referring to FIG. 9, the scan register circuit 2000 may have a fail bit count mode and a position search mode. In the fail bit count mode, the mode signal MODE may be 1 and the dump signal DUMP may be 0. In the position search mode, the mode signal MODE may be 0 and the dump signal DUMP may be 1.

When the operation mode is the fail bit count mode, the bit counter 2300 (see FIG. 6) may receive the information of the scan register in which the fail result is stored from each scan chain unit and determine the number of fail bits.

When the operation mode is the position search mode, the position finder 2400 (see FIG. 6) may receive the information of the scan register where the fail result is stored and the information of the scan register where the fail result is first stored from each scan chain unit. And the position finder 2400 may determine the position index indicating the position of the fail bit.

Figure 10:
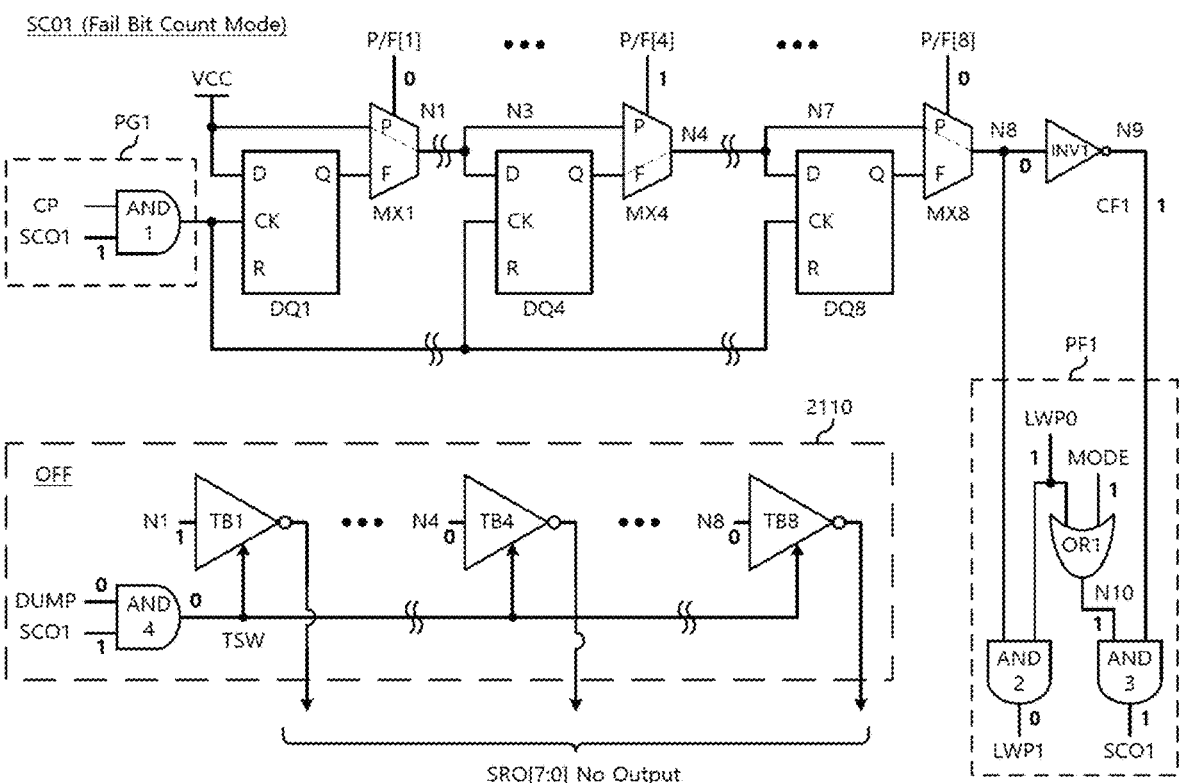
FIG. 10 is a circuit diagram illustrating an example embodiment of an operating method of the first scan chain unit shown in FIG. 8 in the fail bit count mode.

FIG. 10 is a circuit diagram illustrating an example embodiment of an operating method of the first scan chain unit shown in FIG. 8 in the fail bit count mode. Referring to the example of FIG. 10, the first pass/fail result P/F[1] is 0, the fourth pass/fail result P/F[4] is 1, and the eighth pass/fail result P/F[8] is 0.

In fail bit count mode, the mode signal MODE is 1 and the dump signal DUMP is 0. The first to eighth DQ flip-flops DQ1 to DQ8 may all be initialized by a reset signal (see FIG. 15, RST). The reset signal RST may be provided to the R terminal of the first to eighth DQ flip-flops DQ1 to DQ8.

If the first pass/fail result P/F[1] is 0, the P terminal of the first multiplexer MX1 may be connected to the first node N1. The first node N1 may have logic 1 because it is connected to the power terminal. If the fourth pass/fail result P/F[4] is 1, the F terminal of the fourth multiplexer MX4 may be connected to the fourth node N4. Since the fourth DQ flip-flop DQ4 is initialized by the reset signal RST, the fourth node N4 may have logic 0. If the eighth pass/fail result P/F[8] is 0, the P terminal of the eighth multiplexer MX8 may be connected to the seventh node N7. The eighth node N8 may have logic 0.

If the dump signal DUMP is 0, the tri-state switch signal TSW is 0. If the tri-state switch signal TSW is 0, the outputs of the first to eighth tri-state buffers TB1 to TB8 may have high resistance (z) regardless of the input. Therefore, the scan register output signal SRO may not be output.

If the mode signal MODE is 1, the output of the first OR gate OR1 in the first priority filter PF1 is always 1. That is, the tenth node N10 may have logic 1. Therefore, the output of the third AND gate AND3 may have the same value as the logic value of the ninth node N9. That is, the first scan chain output signal SCO1 may be equal to the first chain fail signal CF1. If the first chain fail signal CF1 is 1, the first scan chain output signal SCO1 may be 1.

If the default low priority parameter LWP0 is 1, the first low priority parameter LWP1 may be equal to the logical value of the eighth node N8. If the eighth node N8 is logic 0, the first low priority parameter LWP1 may be logic 0.

Figure 11:
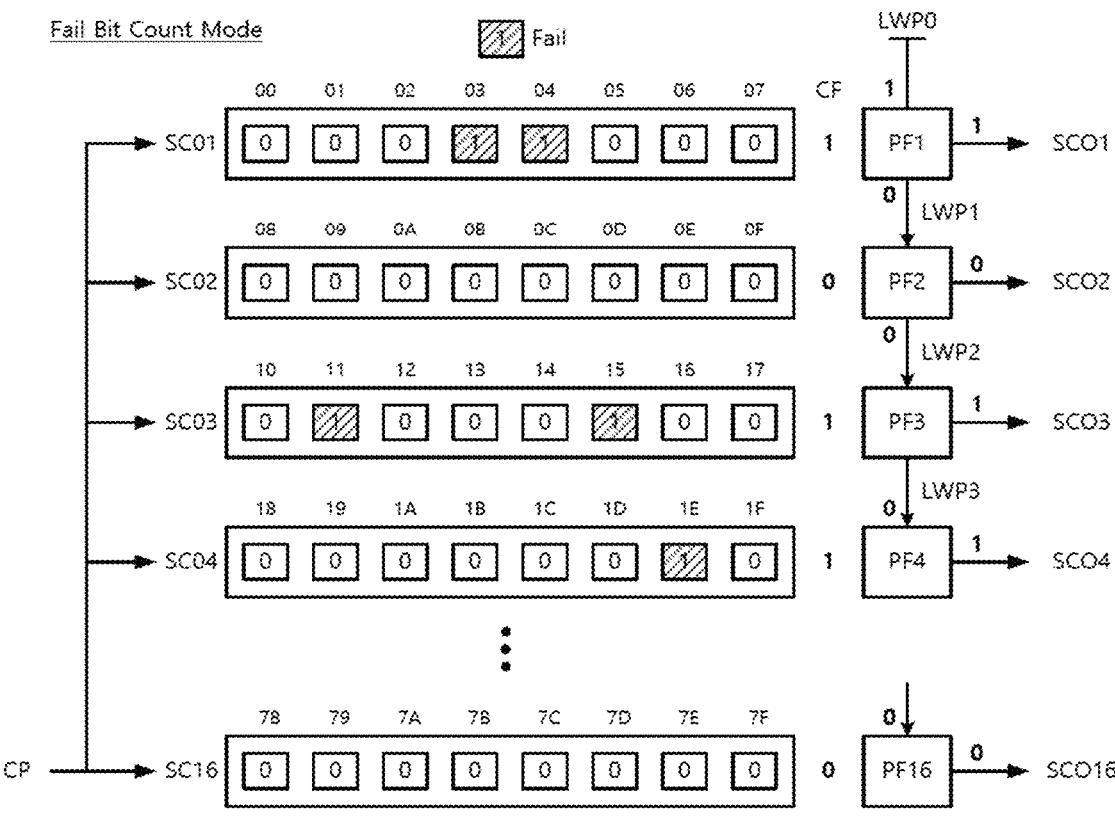
FIG. 11 is a conceptual diagram illustrating the fail bit count operation of the scan register circuit shown in FIG. 6 by way of example.

FIG. 11 is a conceptual diagram illustrating an example embodiment of the fail bit count operation of the scan register circuit shown in FIG. 6. Referring to FIG. 11, the first scan registers 00 to 07 of the first scan chain unit SC01 may have pass/fail results of 0,0,0,1,1,0,0,0, respectively. As described in FIG. 10, the first scan chain unit SC01 may have a first chain fail signal CF1 of logic 1. The first scan chain output signal SCO1 of the first priority filter PF1 may be logic 1.

The second scan registers 08 to 0F of the second scan chain unit SC02 may have pass/fail results of 0,0,0,0,0,0,0,0, respectively. Since the second scan chain unit SC02 is all pass, the second chain fail signal CF2 may be logic 0. The second scan chain output signal SCO2 of the second priority filter PF2 may be logic 0.

The third scan registers 10 to 17 of the third scan chain unit SC03 may have pass/fail results of 0, 1, 0, 0, 0, 1, 0, 0, respectively. The third scan chain unit SC03 may have a third chain fail signal CF3 of logic 1. The third scan chain output signal SCO3 of the third priority filter PF3 may be logic 1.

The fourth scan registers 18 to 1F of the fourth scan chain unit SC04 may have pass/fail results of 0,0,0,0,0,0,1,0, respectively. The fourth scan chain unit SC04 may have a fourth chain fail signal CF4 of logic 1. The fourth scan chain output signal SCO4 of the fourth priority filter PF4 may be logic 1. In this way, the fifth to sixteenth scan chain units SC05 to SC16 may have chain fail signals of logic 0 and scan chain output signals of logic 0.

Figure 12:
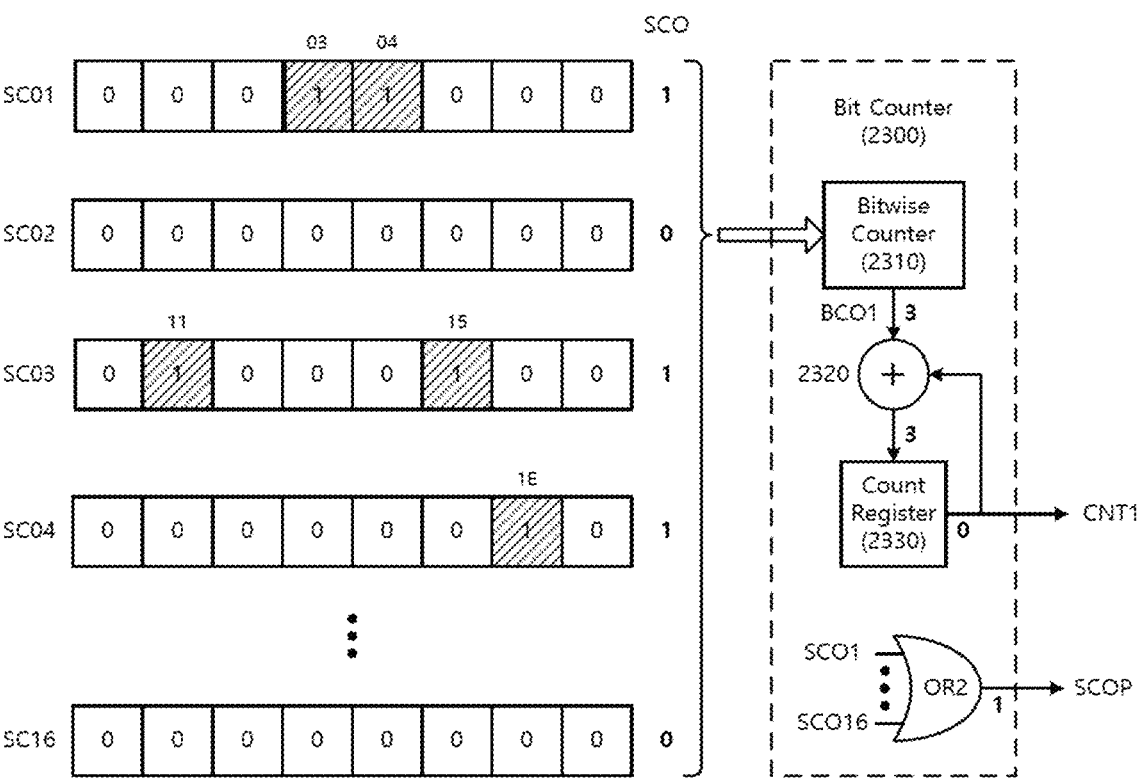
FIGS. 12 to 14 are diagrams illustrating example embodiments of fail bit count operations during the first to third cycles.
Figure 13:
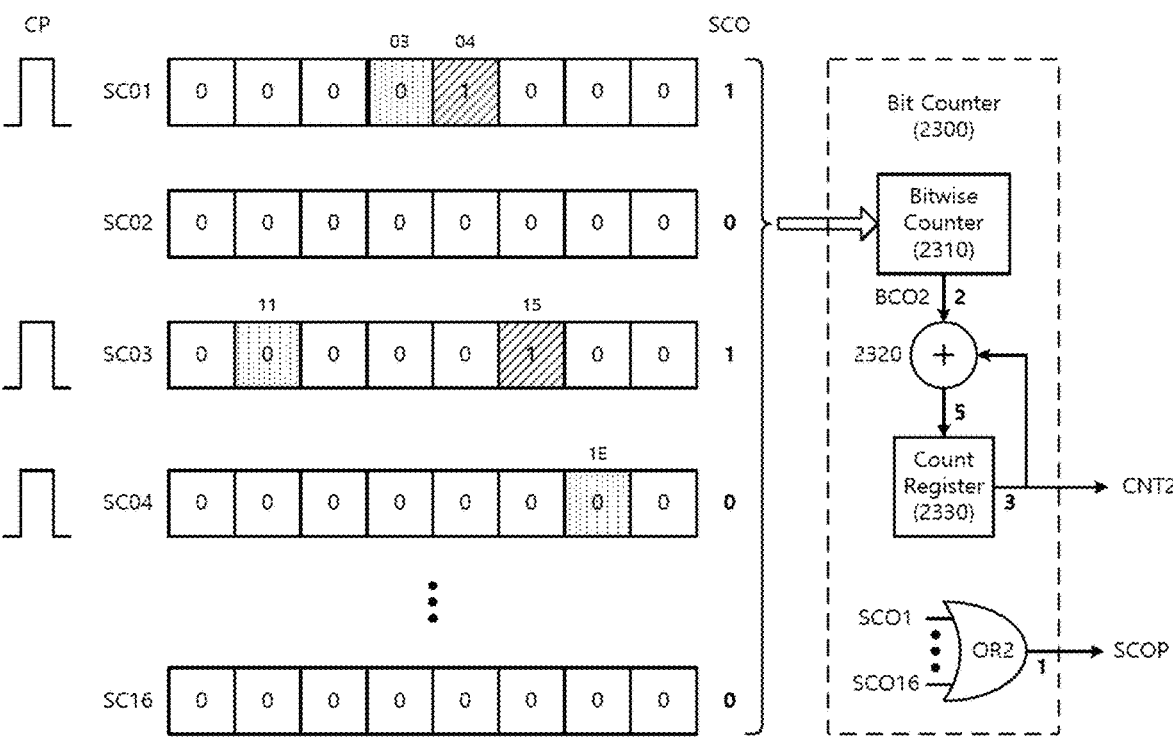
Figure 14:
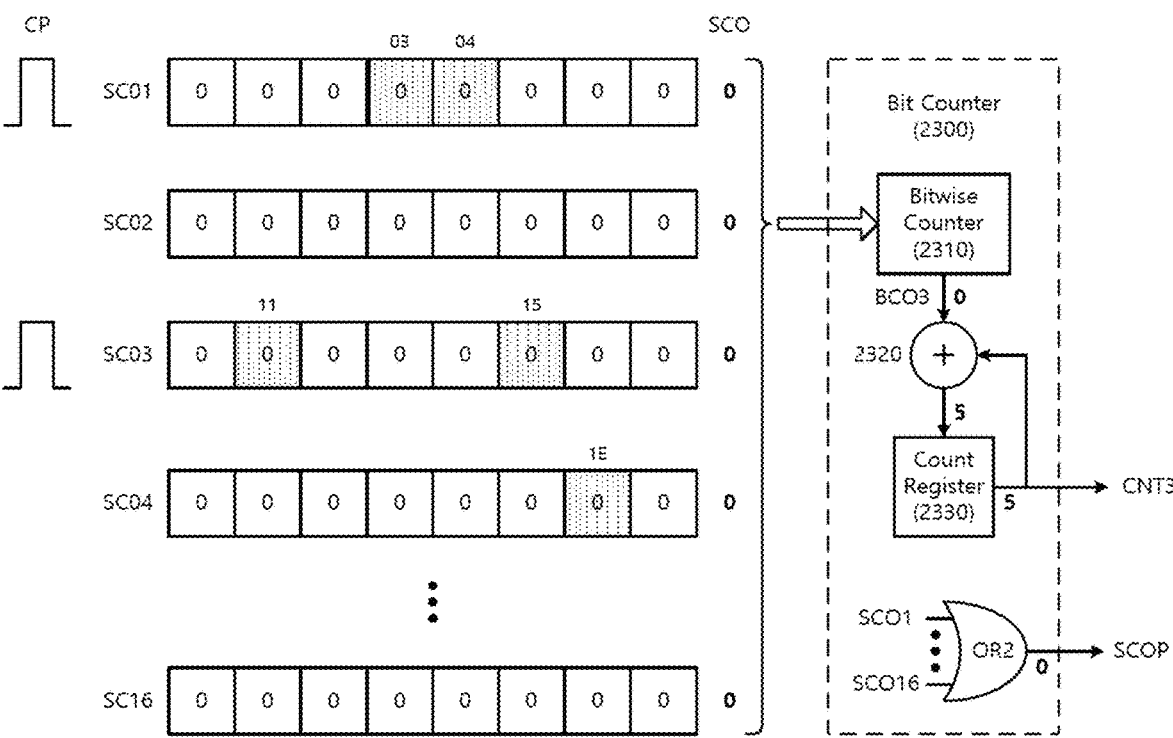

FIGS. 12 to 14 are diagrams illustrating example embodiments of fail bit count operations during the first to third cycles. Referring to FIGS. 12 to 14, the bit counter 2300 may include a bitwise counter 2310, an adder 2320, a count register 2330, and a SCOP output circuit. For example, the SCOP output circuit may be comprised of a second OR logic operation circuit OR2.

Referring to FIG. 12, in the first cycle of the fail bit count mode, a fail result value of 1 may be stored in scan registers 03 and 04 of the first scan chain unit SC01. The first scan chain output signal SCO1 may be 1. The second scan chain unit SC02 may store the pass result value of 0 in the second scan registers 08 to 0F. The second scan chain output signal SCO2 may be 0. A fail result value of 1 may be stored in scan registers 11 and 15 of the third scan chain unit SC03. The third scan chain output signal SCO3 may be 1. The fail result value of 1 may be stored in the 1E scan register of the fourth scan chain unit SC04. The fourth scan chain output signal SCO4 may be 1. The 5th to 16th scan chain output signals SCO5 to SCO16 may be all 0.

The bitwise counter 2310 may receive the first to sixteenth scan chain output signals SCO1 to SCO16 and output the first bit count output signal BCO1. The first bit count output signal BCO1 may be the number of 1 in the first to sixteenth scan chain output signals SCO1 to SCO16. The first bit count output signal BCO1 may be 3.

The adder 2320 may add the first bit count output signal BCO1 and the first output signal CNT1 of the count register 2330. The adder 2320 may add BCO1 and CNT1 and output 3 as a result. The count register 2330 may store the output result of the adder 2320.

The second OR logic operation circuit OR2 may receive the first to sixteenth scan chain output signals SCO1 to SCO16 and output the SCO pass signal SCOP. In the first cycle of the fail bit count mode, the SCO pass signal SCOP may be 1.

Referring to FIG. 13, in the second cycle of the fail bit count mode, when a clear pulse CP is applied, the first fail result stored in the scan registers of each scan chain unit may change from 1 to 0. Since the scan register 03 stores the fail result first among the scan registers of the first scan chain unit SC01, 1 in the scan register 03 may be changed to 0. The scan register 04 may continue to store the fail result value of 1. The first scan chain output signal SCO1 may be 1.

Since the second scan chain unit SC02 stores all 0 as a pass result in the second scan registers 08 to 0F, the second scan chain output signal SCO2 may continue to be 0.

Since the scan register 11 stores the fail result first among the scan registers of the third scan chain unit SC03, 1 in the scan register 11 may be changed to 0. The scan register 15 may continue to store 1 as a fail result. The third scan chain output signal SCO3 may be 1.

Since the scan register 1E stores the fail result first among the scan registers of the fourth scan chain unit SC04, 1 in the scan register 1E may be changed to 0. Since all scan registers of the fourth scan chain unit SC04 store 0, the fourth scan chain output signal SCO4 may change from 1 to 0.

The bitwise counter 2310 may receive first to sixteenth scan chain output signals SCO1 to SCO16 and output a second bit count output signal BCO2. The second bit count output signal BCO2 may be 2. The adder 2320 may add the second bit count output signal BCO2 and the second output signal CNT2 of the count register 2330. The adder 2320 may add BCO2 and CNT2 and output 5 as a result. The count register 2330 may store the output result of the adder 2320.

The second OR logic operation circuit OR2 may receive the first to sixteenth scan chain output signals SCO1 to SCO16 and output the SCO pass signal SCOP. In the second cycle of the fail bit count mode, the SCO pass signal SCOP may be 1.

Referring to FIG. 14, in the third cycle of the fail bit count mode, when a clear pulse CP is applied, the first fail result stored in the scan registers of each scan chain unit may change from 1 to 0.

Since the scan register 04 stores the fail result first among the first scan registers 00 to 07 of the first scan chain unit SC01, 1 in the scan register 04 may be changed to 0. The first scan chain output signal SCO1 may be 0. Since all 0s are stored as a pass result in the second scan registers 08 to 0F of the second scan chain unit SC02, the second scan chain output signal SCO2 may continue to be 0.

Since the scan register 11 stores the fail result first among the third scan registers 10 to 17 of the third scan chain unit SC03, 1 in the scan register 11 may be changed to 0. The third scan chain output signal SCO3 may be 0. Since all 0s are stored as a pass result in the fourth scan registers of the fourth scan chain unit SC04, the fourth scan chain output signal SCO4 may continue to be 0.

The bitwise counter 2310 may receive first to sixteenth scan chain output signals SCO1 to SCO16 and output a third bit count output signal BCO3. The third bit count output signal BCO3 may be 0. The adder 2320 may add the third bit count output signal BCO3 and the third output signal CNT3 of the count register 2330. The adder 2320 may add BCO3 and CNT3 and output 5 as a result. The count register 2330 may store the output result of the adder 2320. The bitwise counter 2310 may count 5 fail bits in 2 count cycles.

The second OR logic operation circuit OR2 may receive the first to sixteenth scan chain output signals SCO1 to SCO16 and output the SCO pass signal SCOP. In the third cycle of the fail bit count mode, since the first to sixteenth scan chain output signals SCO1 to SCO16 are all 0, the SCO pass signal SCOP may be 0. If the SCO pass signal SCOP is 0, the fail bit count operation ends.

Figure 15:
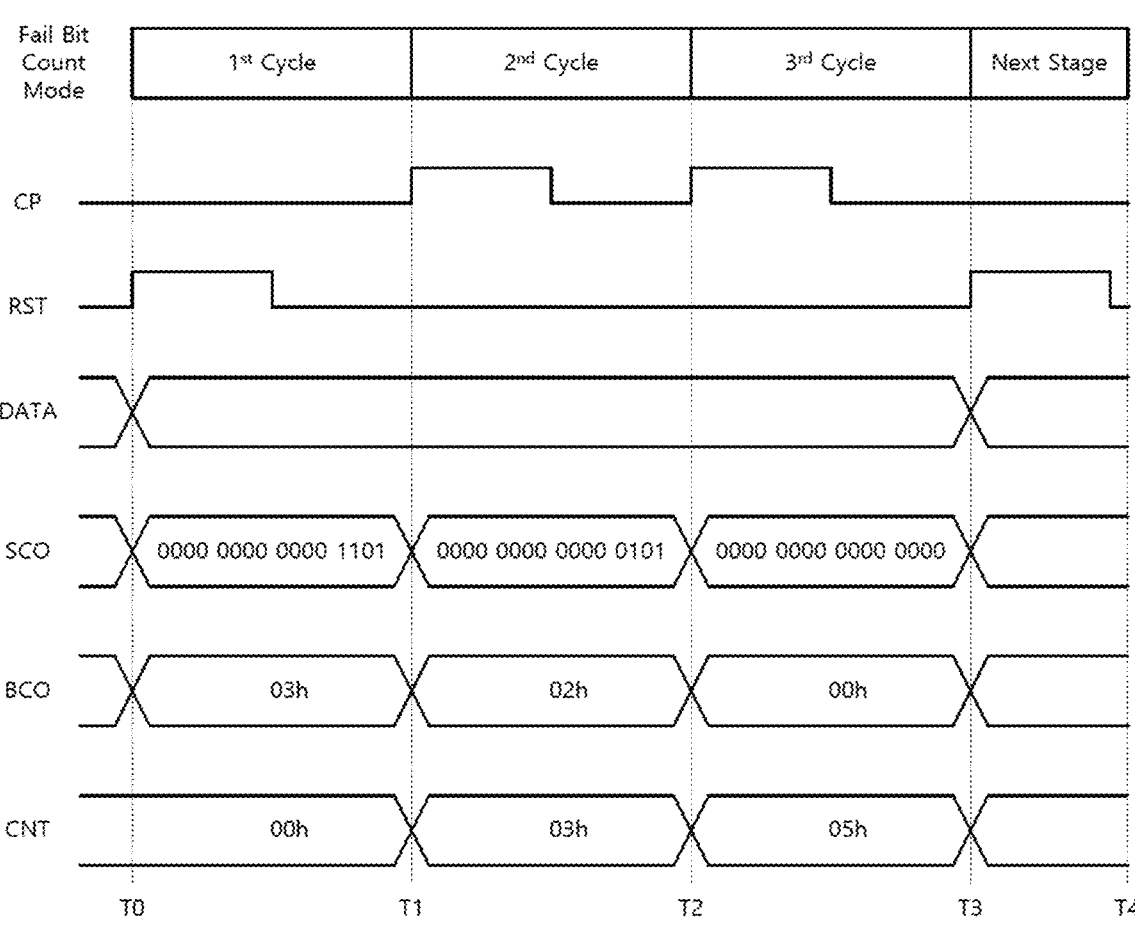
FIG. 15 is a timing diagram illustrating an example embodiment of a fail bit count operation during the first to third cycles.

FIG. 15 is a timing diagram illustrating an example embodiment of a fail bit count operation during the first to third cycles. Referring to FIG. 15, the first cycle may be performed in the T0 to T1 time period, the second cycle may be performed in the T1 to T2 time period, and the third cycle may be performed in the T2 to T3 time period.

In the first cycle of the fail bit count mode, the first scan chain output signal SCO1 may be 1, the second scan chain output signal SCO2 may be 0, the third scan chain output signal SCO3 may be 1, and the scan chain output signal SCO4 may be 1. The 5th to 16th scan chain output signals SCO5 to SCO16 may be all 0.

The scan chain output signal SCO[15:0] may be 0000 0000 0000 1101. The first bit count output signal BCO1 may be 3. The adder 2320 may add the first bit count output signal BCO1 and the first output signal CNT1 of the count register 2330. The adder 2320 may add BCO1 and CNT1 and output 3 as a result.

In the second cycle of the fail bit count mode, when a clear pulse CP is applied, the first fail result among the fail results stored in the scan registers of each scan chain unit may change from 1 to 0. The first scan chain output signal SCO1 is 1, the second scan chain output signal SCO2 is 0, the third scan chain output signal SCO3 is 1, and the fourth scan chain output signal SCO4 is 0. The 5th to 16th scan chain output signals SCO5 to SCO16 may be all 0.

The scan chain output signal SCO[15:0] may be 0000 0000 0000 0101. The second bit count output signal BCO2 may be 2. The adder 2320 may add BCO2 and CNT2 and output 5 as a result.

In the third cycle of the fail bit count mode, when a clear pulse CP is applied, the first fail result among the fail results stored in the scan registers of each scan chain unit may change from 1 to 0. The first and third scan chain output signals (SCO1, SCO3) may be 0.

Therefore, all of the first to sixteenth scan chain output signals SCO1 to SCO16 may be 0. The third bit count output signal BCO3 may be 0. The adder 2320 may add BCO3 and CNT3 and output 5 as a result. The count register 2330 may store the output result of the adder 2320.

In the fail bit count mode, the plurality of scan chain units may operate in parallel at the same time. Accordingly, the scan register circuit 2000 may obtain 5 fail bits through the first and second cycles in the above example. The scan register circuit 2000 may perform a fail bit count operation at high speed by operating the plurality of scan chain units simultaneously in the fail bit count mode.

Figure 16:
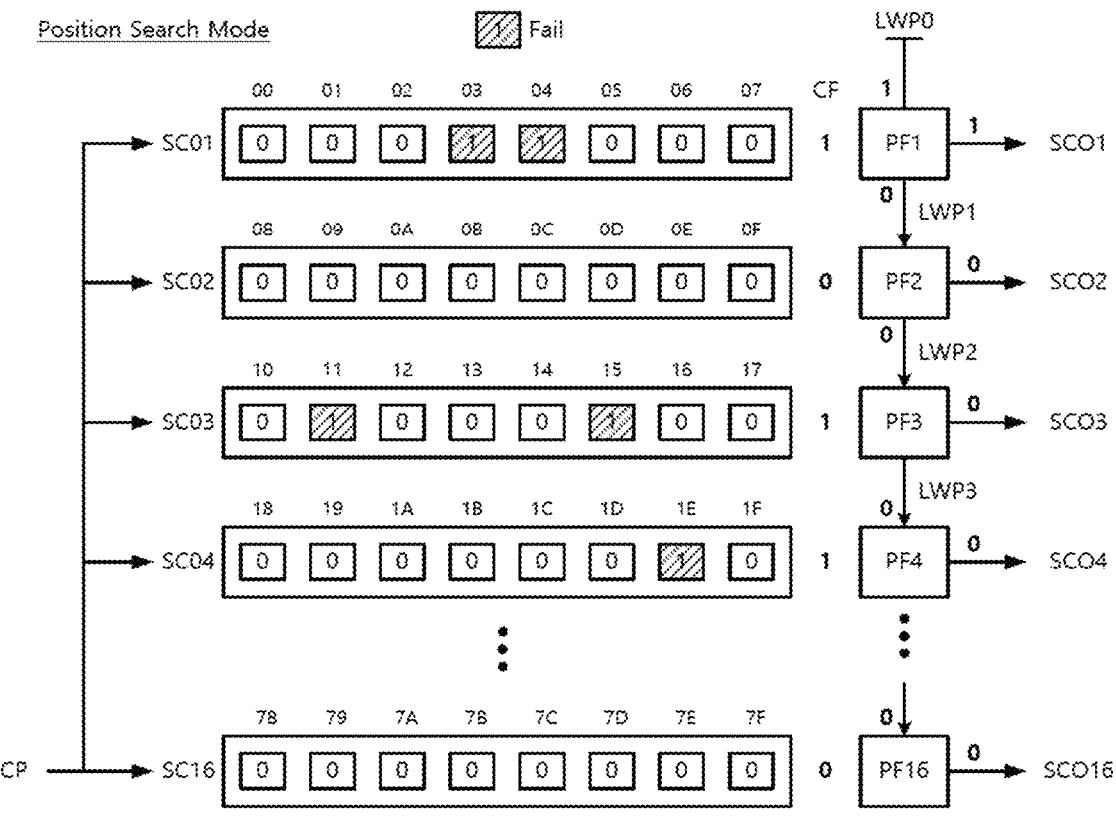
FIG. 16 is a conceptual diagram illustrating an example embodiment of a position search operation of the scan register circuit shown in FIG. 6.

FIG. 16 is a conceptual diagram illustrating an example embodiment of a position search operation of the scan register circuit shown in FIG. 6. Referring to FIG. 16, the first scan registers 00 to 07 of the first scan chain unit SC01 may have pass/fail results of 0,0,0,1,1,0,0,0, respectively. As described in FIG. 10, the first scan chain unit SC01 may have a first chain fail signal CF1 of logic 1. The first scan chain output signal SCO1 of the first priority filter PF1 may be logic 1.

The second scan registers 08 to 0F of the second scan chain unit SC02 may have pass/fail results of 0,0,0,0,0,0,0,0, respectively. Since the second scan chain unit SC02 is all pass, the second chain fail signal CF2 may be logic 0. In the position search mode, the mode signal MODE is 0, so the second scan chain output signal SCO2 of the second priority filter PF2 may be logic 0.

The third scan registers 10 to 17 of the third scan chain unit SC03 may have pass/fail results of 0, 1, 0, 0, 0, 1, 0, 0, respectively. The third scan chain unit SC03 may have a third chain fail signal CF3 of logic 1. In the position search mode, the mode signal MODE is 0, so the third scan chain output signal SCO3 of the third priority filter PF3 may be logic 0.

The fourth scan registers 18 to 1F of the fourth scan chain unit SC04 may have pass/fail results of 0,0,0,0,0,0,1,0, respectively. The fourth scan chain unit SC04 may have a fourth chain fail signal CF4 of logic 1. In the position search mode, the mode signal MODE is 0, so the fourth scan chain output signal SCO4 of the fourth priority filter PF4 may be logic 0.

In this way, the fifth to sixteenth scan chain units SC05 to SC16 may have chain fail signals of logic 0 and scan chain output signals of logic 0. In position search operations, only the highest priority scan chain may have logic 1 through priority filters.

Figure 17:
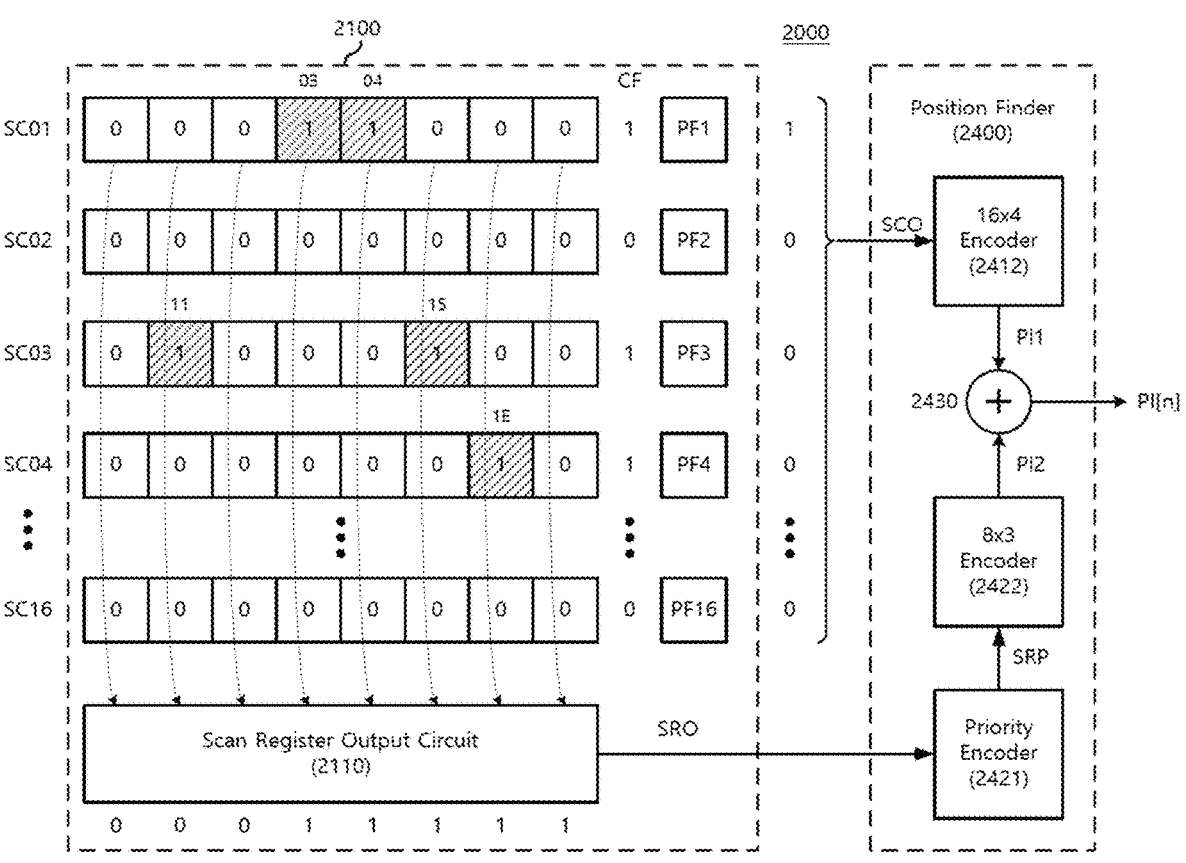
FIG. 17 is a block diagram for explaining the position search operation of the scan register circuit shown in FIG. 16.

FIG. 17 is a block diagram for explaining the position search operation of the scan register circuit shown in FIG. 16.

Referring to FIG. 17, the scan register circuit 2000 may include a scan register array 2100 and a position finder 2400. The position finder 2400 may receive a scan chain output signal SCO and a scan register output signal SRO from the first to sixteenth scan chain units SC01 to SC16 of the scan register array 2100. The position finder 2400 may output a position index PI[n] to detect the position of the fail bit.

The position finder 2400 may include a scan chain encoder 2412, a priority encoder 2421, a scan register encoder 2422, and an adder 2430. The scan chain encoder 2412 may be a 16×4 encoder, for example. The scan register encoder 2422 may be an 8×3 encoder, for example.

The scan register array 2100 may store the fail result value of 1 in scan registers (e.g., 03, 04, 11, 15, and 1E). Since the scan chain units (SC01, SC03, and SC04) store the fail result value of 1, the chain fail signal CF[15:0] may be 0000 0000 0000 1101.

The first to sixteenth priority filters PF1 to PF16 may receive the first to sixteenth chain fail signals CF[15:0] and output a scan chain output signal SCO. The first to sixteenth priority filters PF1 to PF16 may make all subsequent data to 0 when the first 1 is output. The scan chain output signal SCO[15:0] may be 0000 0000 0000 0001.

The scan register array 2100 may output a scan register output signal SRO[7:0] through the scan register output circuit 2110. The scan register output signal SRO[7:0] may be 1111 1000. The priority encoder 2421 of the position finder 2400 may output the scan register priority signal SRP[7:0]. The priority encoder 2421 may make all subsequent data to 0 when the first 1 is output. The scan register priority signal SRP[7:0] may be 0000 1000.

FIGS. 18 and 19 are tables for explaining the operation of the 16×4 encoder and 8×3 encoder shown in FIG. 17.

Referring to FIG. 18, the 16×4 scan chain encoder 2412 may receive the scan chain output signal SCO and output the first position index PI1. For example, if the scan chain output signal SCO[15:0] is 0000 0000 0000 0001, the first position index PI1[3:0] may be 0000.

Referring to FIG. 19, the 8×3 scan register encoder 2422 may receive a scan register priority signal SRP and output a second position index PI2. For example, if the scan register priority signal SRP[7:0] is 0000 1000, the second position index PI2[2:0] may be 011.

Referring again to FIG. 17, the adder 2430 may receive the first position index PI1 and the second position index PI2 and output the position index signal PI[n]. For example, if the first position index PI1[3:0] is 0000 and the second position index PI2[2:0] is 011, the adder 2430 may output PI[n], that is, 0000011.

Figure 20:
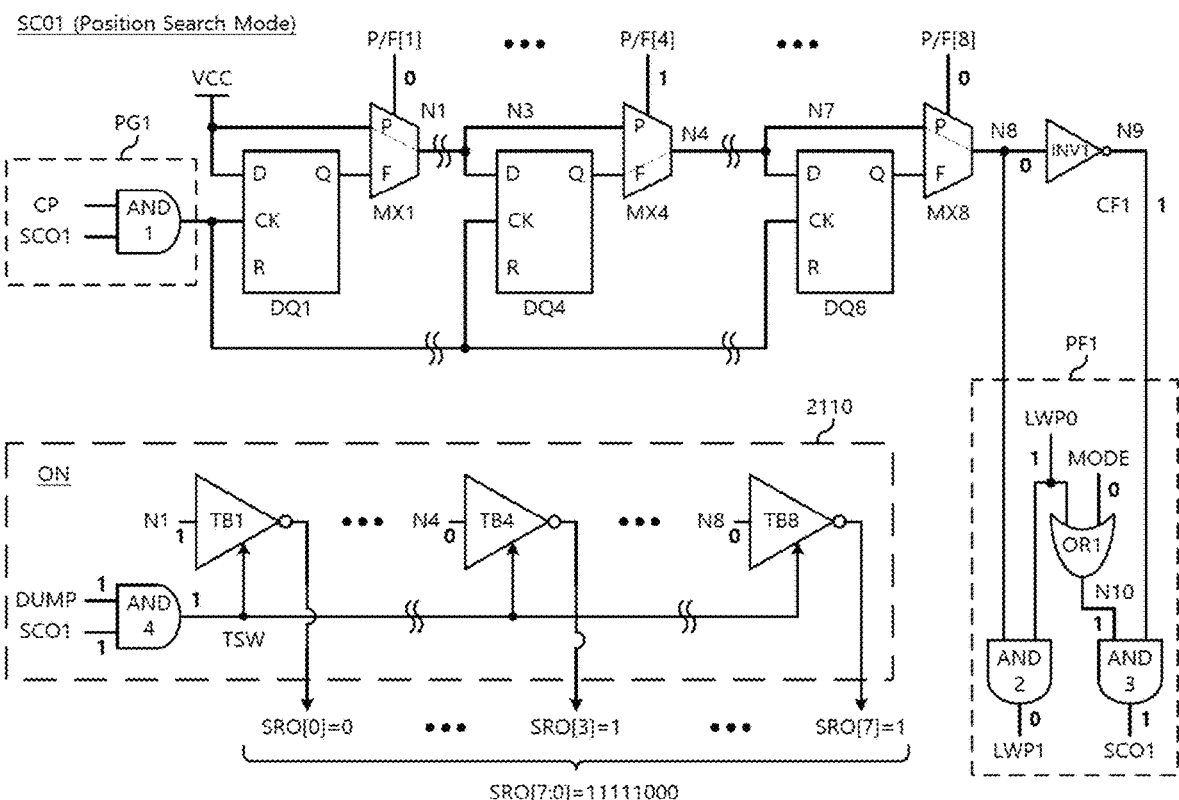
FIG. 20 is a circuit diagram illustrating an example embodiment of the position search mode of the first scan chain unit shown in FIG. 17.

FIG. 20 is a circuit diagram illustrating an example embodiment of the position search mode of the first scan chain unit shown in FIG. 17. Referring to FIG. 20, the first pass/fail result P/F[1] is 0, the fourth pass/fail result P/F[4] is 1, and the eighth pass/fail result P/F[8] is 0. Referring to FIG. 9, in the position search mode, the mode signal MODE is 0 and the dump signal DUMP is 1. The first to eighth DQ flip-flops DQ1 to DQ8 may all be initialized by a reset signal provided to the R terminal.

If the first pass/fail result P/F[1] is 0, the P terminal of the first multiplexer MX1 may be connected to the first node N1. The first node N1 may be logic 1 because it is connected to the power terminal. If the fourth pass/fail result P/F[4] is 1, the F terminal of the fourth multiplexer MX4 may be connected to the fourth node N4. Since the fourth DQ flip-flop DQ4 may be initialized by a reset signal, the fourth node N4 may be logic 0. If the eighth pass/fail result P/F[8]

is 0, the P terminal of the eighth multiplexer MX8 may be connected to the seventh node N7. The eighth node N8 may be logic 0.

If the dump signal DUMP is 1 and the first scan chain output signal SCO1 is 1, the tri-state switch signal TSW is 1. If the tri-state switch signal TSW is 1, the output of the first to eighth tri-state buffers TB1 to TB8 may be the inverted value of the input. For example, since the first node N1 is 1, SRO[0] may be 0. Since the fourth node N4 is 0, SRO[3] may be 1. Since the eighth node N8 is 0, SRO[7] may be 1. The scan register output signal SRO[7:0] of the scan register output circuit 2110 may be 1111 1000.

If the mode signal MODE is 0, the output of the first OR gate OR1 in the first priority filter PF1 may be determined according to the default lower priority parameter LWP0. If the default low priority parameter LWP0 is 1, the 10th node N10 may be logic 1. Therefore, the output of the third AND gate AND3 may have the same value as the logic value of the ninth node N9. That is, the first scan chain output signal SCO1 may be equal to the first chain fail signal CF1. If the first chain fail signal CF1 is 1, the first scan chain output signal SCO1 may be 1.

If the default low priority parameter LWP0 is 1, the first low priority parameter LWP1 may be equal to the logical value of the eighth node N8. If the eighth node N8 is logic 0, the first low priority parameter LWP1 may be logic 0.

FIGS. 21 to 25 are diagrams illustrating example embodiments of the position search mode during the first to fifth cycles of the scan register circuit shown in FIG. 17. Referring to FIGS. 21 to 25, the position finder 2400 may include a 16×4 encoder 2412, a priority encoder 2421, an 8×3 encoder 2422, and an adder 2430.

Figure 21:
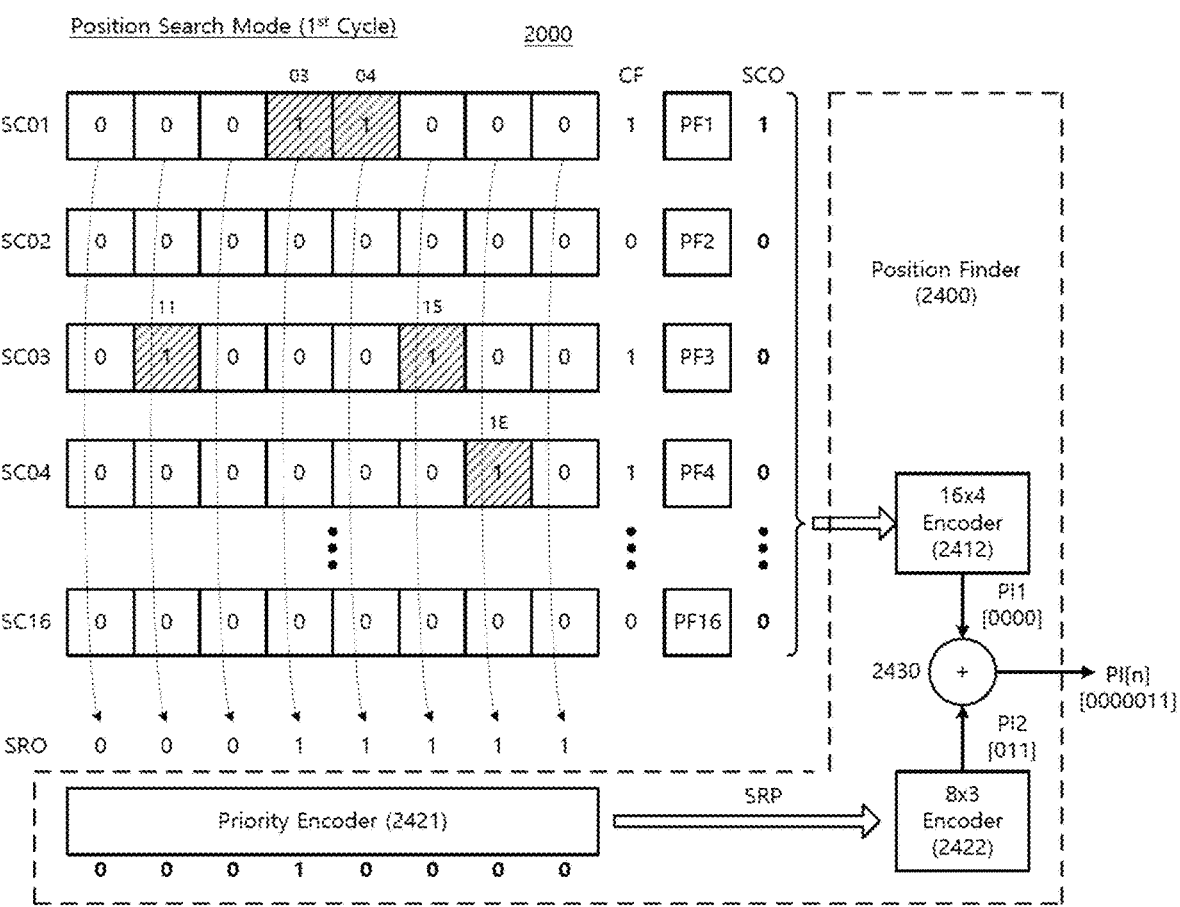
FIGS. 21 to 25 are diagrams illustrating example embodiments of the position search mode during the first to fifth cycles of the scan register circuit shown in FIG. 17.

Referring to FIG. 21, in the first cycle of the position search mode, the fail result value of 1 may be stored in the scan registers 03 and 04 of the first scan chain unit SC01, and the first chain fail signal CF1 may be 1. The pass result value of 0 may be stored in the scan registers 08 to 0F of the second scan chain unit SC02, and the second chain fail signal CF2 may be 0. The fail result value of 1 may be stored in the scan registers 11 and 15 of the third scan chain unit SC03, and the third chain fail signal CF3 may be 1. The fail result value of 1 may be stored in the scan register 1E of the fourth scan chain unit SC04, and the fourth chain fail signal CF4 may be 1. All of the 5th to 16th chain fail signals CF5 to CF16 may be 0.

In the first cycle of the position search mode, the chain fail signal CF[15:0] may be 0000 0000 0000 1101. The priority filters PF1 to PF16 may receive the chain fail signal CF[15:0] and output a scan chain output signal SCO[15:0]. The scan chain output signal SCO[15:0] may be 0000 0000 0000 0001.

The scan register output circuit 2110 (see FIG. 20) may output a scan register output signal SRO[7:0]. The scan register output signal SRO[7:0] may be 1111 1000. The priority encoder 2421 of the position finder 2400 may output a scan register priority signal SRP[7:0]. The scan register priority signal SRP[7:0] may be 0000 1000.

The 16×4 encoder 2412 may receive a scan chain output signal SCO[15:0] and output a first position index PI1. If the scan chain output signal SCO[15:0] is 0000 0000 0000 0001, the first position index PI1[3:0] may be 0000. The 8×3 encoder 2422 may receive a scan register priority signal SRP and output a second position index PI2. If the scan register priority signal SRP[7:0] is 0000 1000, the second position index PI2[2:0] may be 011.

The adder 2430 may receive a first position index PI1 and a second position index PI2 and output a position index signal PI[n]. If the first position index PI1[3:0] is 0000 and the second position index PI2[2:0] is 011, the adder 2430 may output the position index signal PI[n]. The position index signal PI[n] may be 0000011. The PI[n] may be a position index indicating the position of scan register 03 of the scan register array 2100.

The position of the scan register 03 may be a location where both the scan chain output signal SCO and the scan register priority signal SRP are 1. When the scan operation proceeds from the scan register 00 to the scan register 7F, the scan register 03 may store the first fail bit. The scan register circuit 2000 may output a position index PI[n] indicating the position of the scan register 03 in the first cycle of the position search mode.

Figure 22:
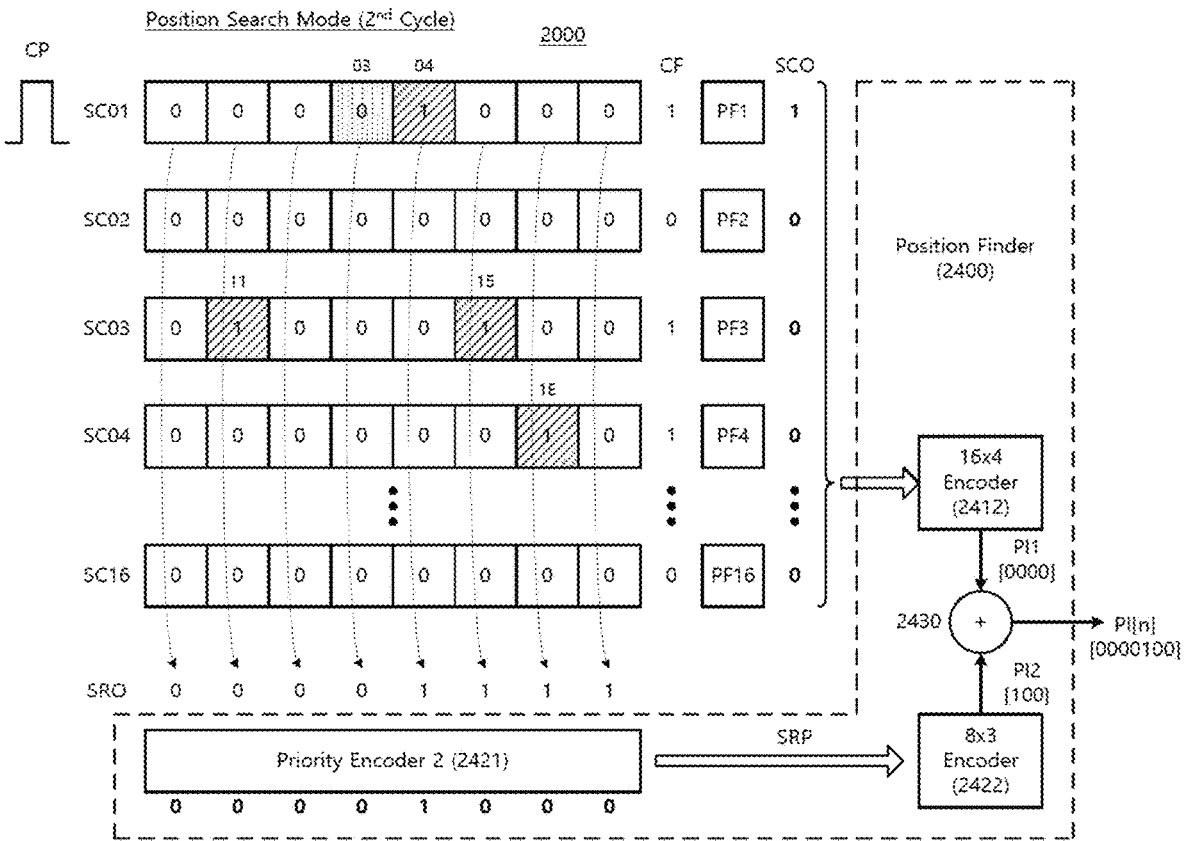

Referring to FIG. 22, when the clear pulse CP is applied in the second cycle of the position search mode, the scan register 03 of the first scan chain unit SC01 may be cleared, and the fail result value of 1 stored in the scan register 04 may be maintained. The first chain fail signal CF1 may be 1. The second chain fail signal CF2 may be 0, and the third and fourth chain fail signals CF3 and CF4 may be 1. All of the 5th to 16th chain fail signals CF5 to CF16 may be 0.

In the second cycle of the position search mode, the chain fail signal CF[15:0] may be 0000 0000 0000 1101. The scan chain output signal SCO[15:0] may be 0000 0000 0000 0001. The scan register output signal SRO[7:0] may be 1111 0000. The scan register priority signal SRP[7:0] may be 0001 0000.

If the scan chain output signal SCO[15:0] is 0000 0000 0000 0001, the first position index PI1[3:0] may be 0000. If the scan register priority signal SRP[7:0] is 0001 0000, the second position index PI2[2:0] may be 100. If the first position index PI1[3:0] is 0000 and the second position index PI2[2:0] is 100, the position index signal may be PI[n]=[0000100]. The position index signal PI[n] may indicate the position of the scan register 04.

Figure 23:
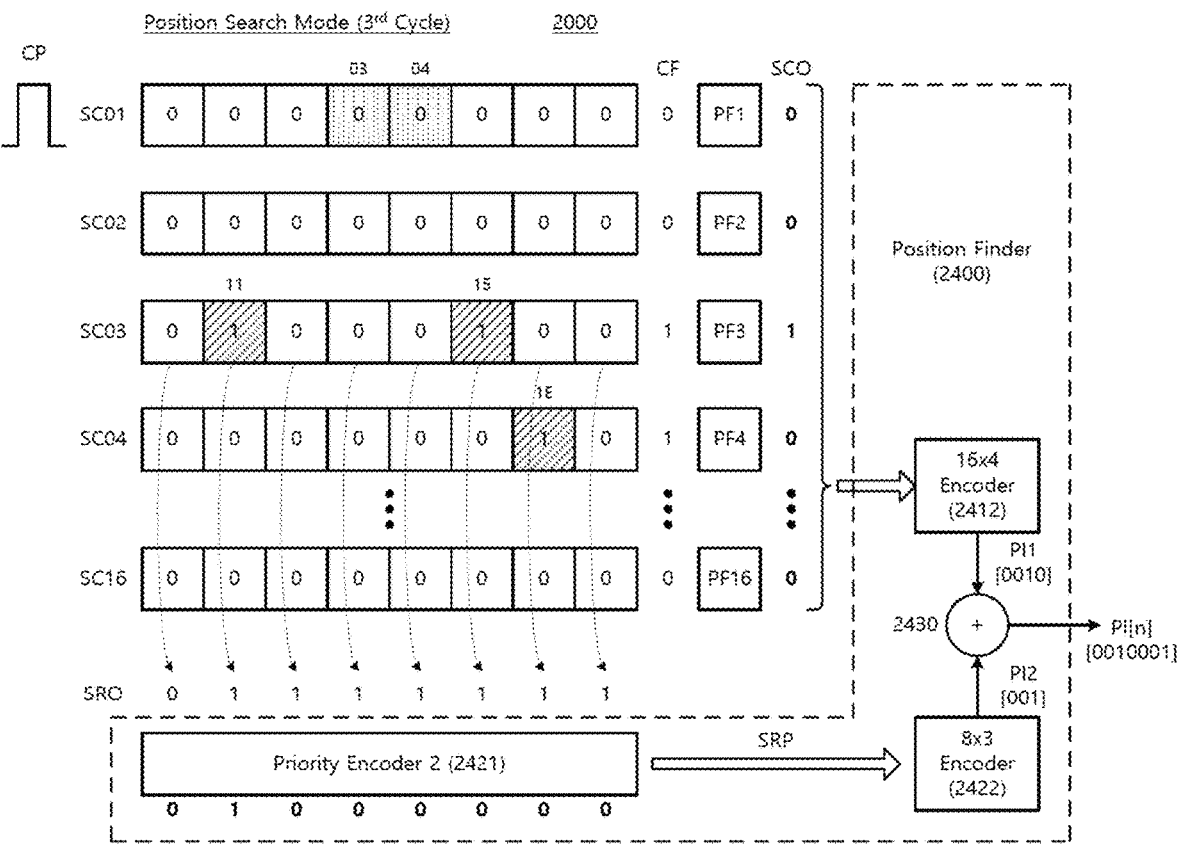

Referring to FIG. 23, when the clear pulse CP is applied in the third cycle of the position search mode, the scan register 04 of the first scan chain unit SC01 may be cleared, and the first chain fail signal CF1 may be 0. The second chain fail signal CF2 may be 0, and the third and fourth chain fail signals CF3 and CF4 may be 1. All of the 5th to 16th chain fail signals CF5 to CF16 may be 0.

In the third cycle of the position search mode, the chain fail signal CF[15:0] may be 0000 0000 0000 1100. The scan chain output signal SCO[15:0] may be 0000 0000 0000 0100. The scan register output signal SRO[7:0] is It could be 1111 1110. The scan register priority signal SRP[7:0] may be 0000 0010.

If the scan chain output signal SCO[15:0] is 0000 0000 0000 0100, the first position index PI1[3:0] may be 0010. If the scan register priority signal SRP[7:0] is 0000 0010, the second position index PI2[2:0] may be 001. If the first position index PI1[3:0] is 0010 and the second position index PI2[2:0] is 001, the position index signal may be PI[n]=[0010001]. The position index signal PI[n]= [0010001] may indicate the position of the scan register 11.

Figure 24:
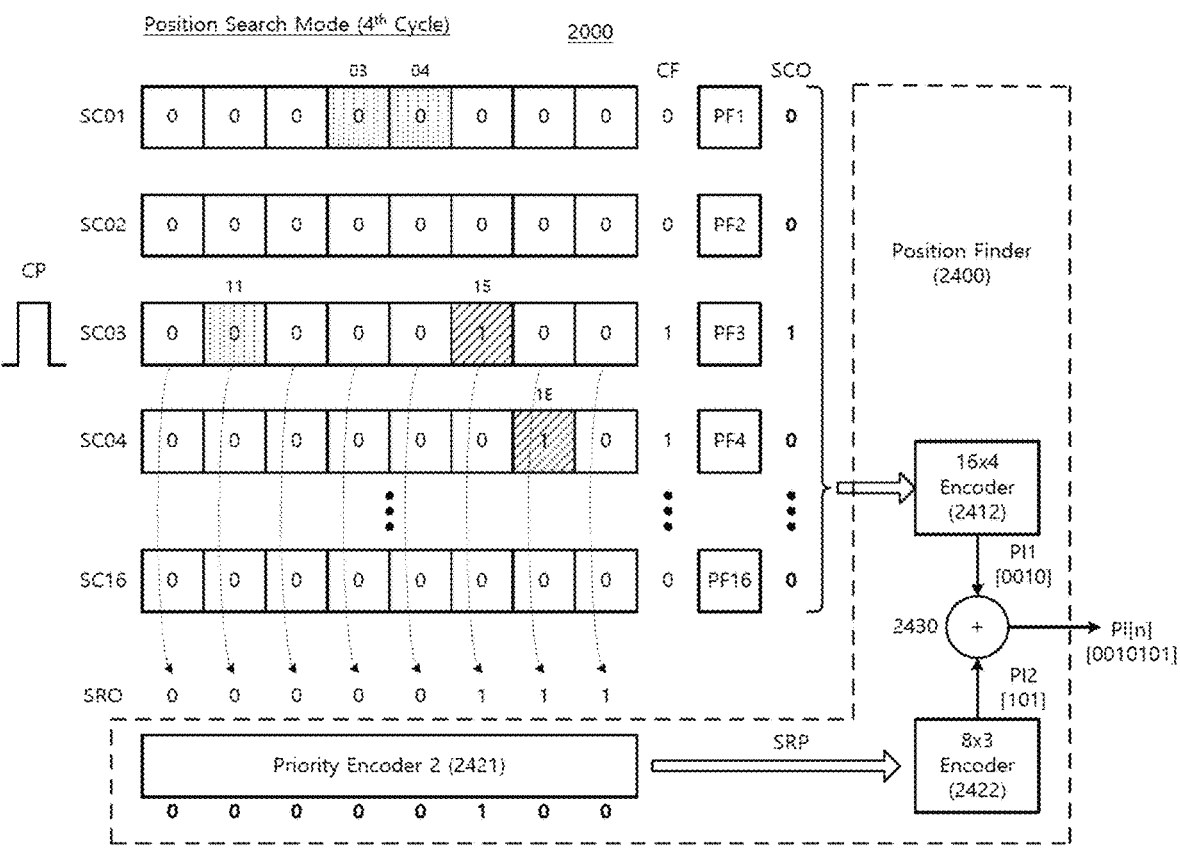

Referring to FIG. 24, when the clear pulse CP is applied in the fourth cycle of the position search mode, the scan register 11 of the third scan chain unit SC03 may be cleared, and the third chain fail signal CF3 may be 1. The fourth chain fail signal CF4 may be 1. All of the 5th to 16th chain fail signals CF5 to CF16 may be 0.

In the fourth cycle of the position search mode, the chain fail signal CF[15:0] may be 0000 0000 0000 1100. The scan chain output signal SCO[15:0] may be 0000 0000 0000

0100. The scan register output signal SRO[7:0] may be 1110 0000. The scan register priority signal SRP[7:0] may be 0010 0000.

If the scan chain output signal SCO[15:0] is 0000 0000 0000 0100, the first position index PI1[3:0] may be 0010. If the scan register priority signal SRP[7:0] is 0010 0000, the second position index PI2[2:0] may be 101. If the first position index PI1[3:0] is 0010 and the second position index PI2[2:0] is 101, the position index signal may be PI[n]=[0010101]. The position index signal PI[n]= [0010101] may indicate the position of the scan register 15.

Figure 25:
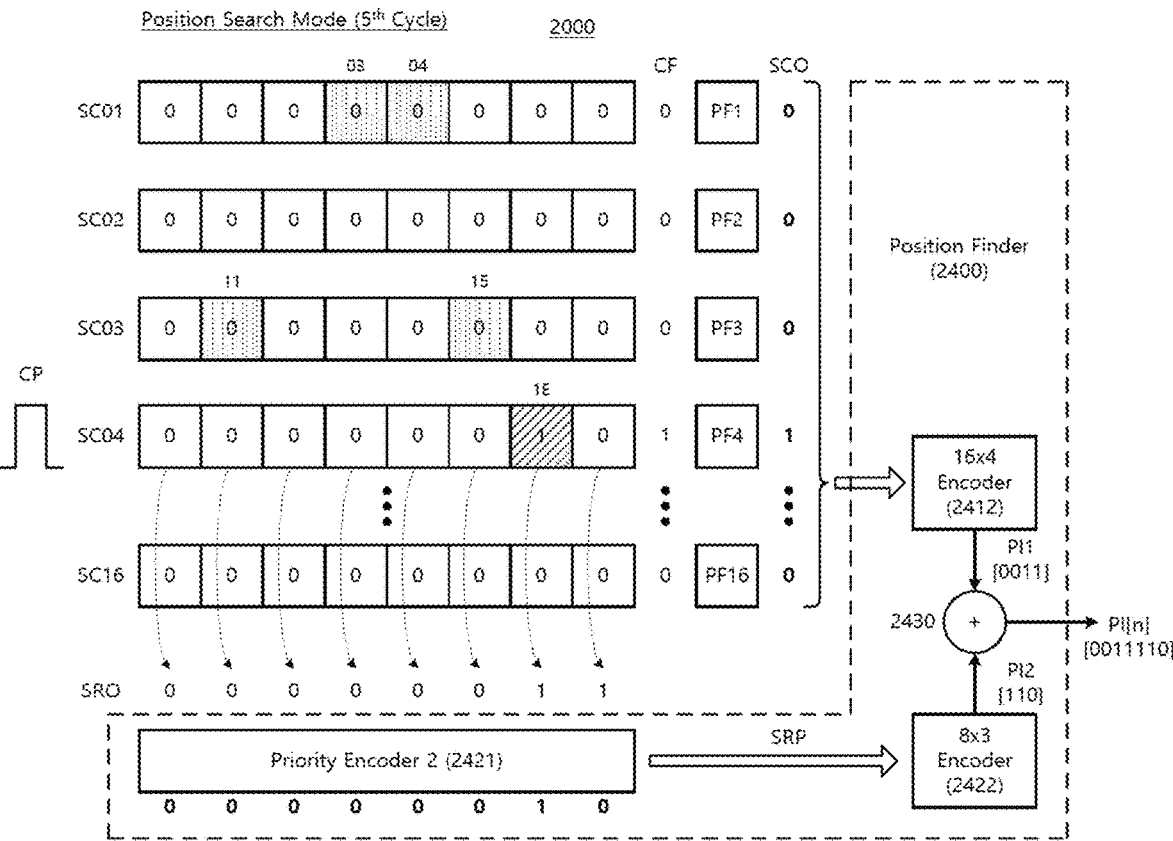

Referring to FIG. 25, when the clear pulse CP is applied in the fifth cycle of the position search mode, the scan register 15 of the third scan chain unit SC03 may be cleared, and the third chain fail signal CF3 may be 0. The fourth chain fail signal CF4 may be 1. All of the 5th to 16th chain fail signals CF5 to CF16 may be 0.

In the fifth cycle of the position search mode, the chain fail signal CF[15:0] may be 0000 0000 0000 1000. The scan chain output signal SCO[15:0] may be 0000 0000 0000 1000. The scan register output signal SRO[7:0] may be 1100 0000. The scan register priority signal SRP[7:0] may be 0100 0000.

If the scan chain output signal SCP[15:0] is 0000 0000 0000 1000, the first position index PI1[3:0] may be 0011. If the scan register priority signal SRP[7:0] is 0100 0000, the second position index PI2[2:0] may be 110. If the first position index PI1[3:0] is 0011 and the second position index PI2[2:0] is 110, the position index signal may be PI[n]=[0011110]. The position index signal PI[n]=[0011110] may indicate the position of the scan register 1E.

Figure 26:
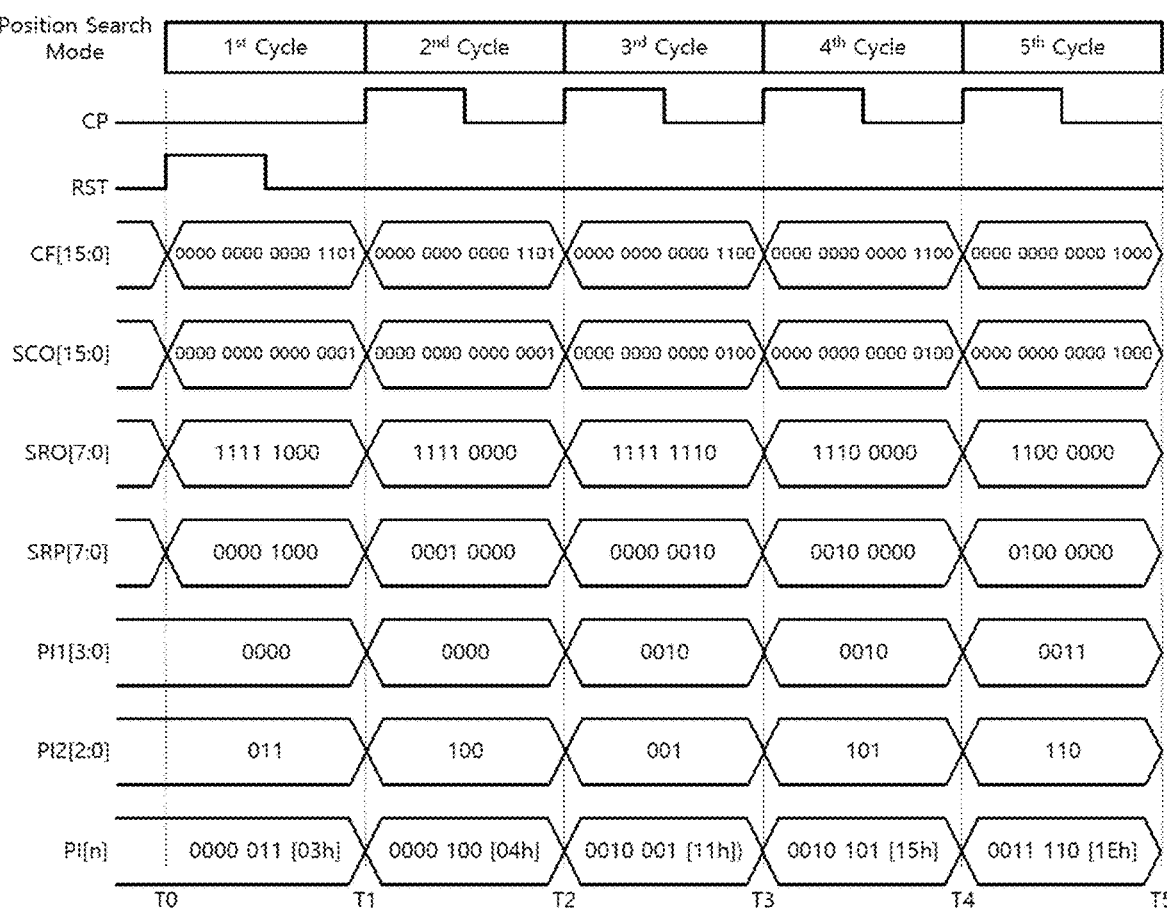
FIG. 26 is a timing diagram illustrating the position search mode during the first to fifth cycles of the scan register circuit shown in FIG. 17.

FIG. 26 is a timing diagram illustrating the position search mode during the first to fifth cycles of the scan register circuit shown in FIG. 17.

In the first cycle of the position search mode, the chain fail signal CF[15:0] may be 0000 0000 0000 1101. The scan chain output signal SCO[15:0] may be 0000 0000 0000 0001. The scan register output signal SRO[7:0] may be 1111 1000. The scan register priority signal SRP[7:0] may be 0000 1000. The first position index PI1[3:0] may be 0000. The second position index PI2[2:0] may be 011. The position index signal PI[n]=[0000011] may indicate the position of the scan register 03.

In the second cycle of the position search mode, the chain fail signal CF[15:0] may be 0000 0000 0000 1101. The scan chain output signal SCO[15:0] may be 0000 0000 0000 0001. The scan register output signal SRO[7:0] may be 1111 0000. The scan register priority signal SRP[7:0] may be 0001 0000. The first position index PI1[3:0] may be 0000. The second position index PI2[2:0] may be 100. The position index signal PI[n]=[0000100] may indicate the position of the scan register 04.

In the third cycle of the position search mode, the chain fail signal CF[15:0] may be 0000 0000 0000 1100. The scan chain output signal SCO[15:0] may be 0000 0000 0000 0100. The scan register output signal (SRO[7:0] may be 1111 1110. The scan register priority signal SRP[7:0] may be 0000 0010. The first position index PI1[3:0] may be 0010. The second position index PI2[2:0] may be 001. The position index signal PI[n]=[0010001] may indicate the position of the scan register 11.

In the fourth cycle of the position search mode, the chain fail signal CF[15:0] may be 0000 0000 0000 1100. The scan chain output signal SCO[15:0] may be 0000 0000 0000 0100. The scan register output signal SRO[7:0] may be 1110 0000. The scan register priority signal SRP[7:0] may be 0010 0000. The first position index PI1[3:0] may be 0010.

The second position index PI2[2:0] may be 101. The position index signal PI[n]=[0010101] may indicate the position of the scan register 15.

In the fifth cycle of the position search mode, the chain fail signal CF[15:0] may be 0000 0000 0000 1000. The scan chain output signal SCO[15:0] may be 0000 0000 0000 1000. The scan register output signal SRO[7:0] may be 1100 0000. The scan register priority signal SRP[7:0] may be 0100 0000. The first position index PI1[3:0] may be 0011. The second position index PI2[2:0] may be 110. The position index signal PI[n]=[0011110] may indicate the position of the scan register 1E.

Figure 27:
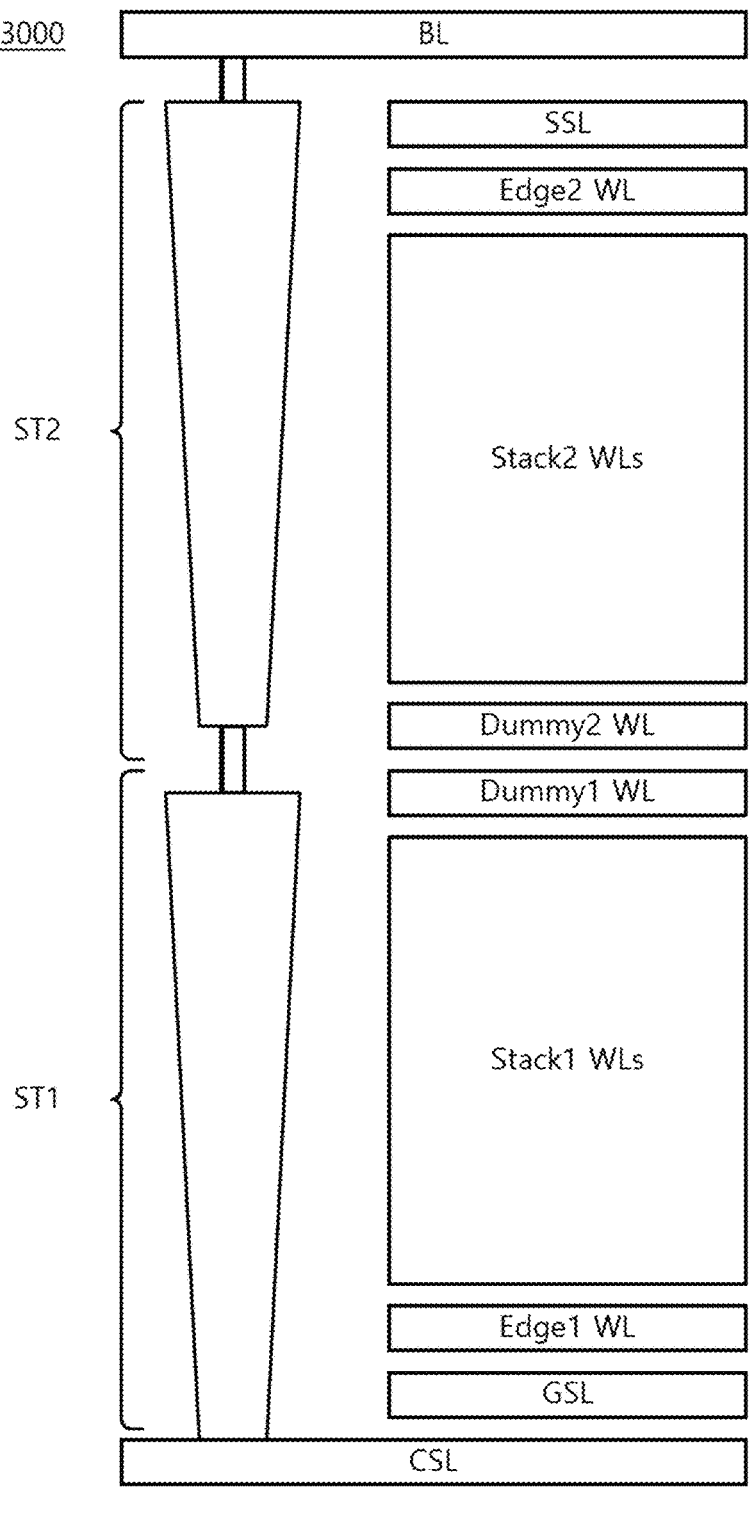
FIG. 27 is a diagram illustrating an example embodiment of a memory device having a multi-stack structure.

FIG. 27 is a diagram illustrating an example embodiment of a memory device having a multi-stack structure. Referring to FIG. 27, the memory device 3000 may have a first stack ST1 and a second stack ST2. The first stack ST1 may be located at the bottom, and the second stack ST2 may be located at the top.

A pillar of the memory device 3000 may be formed by bonding the first and second stacks ST1 and ST2. A plurality of dummy word lines (e.g., Dummy1 WL and Dummy2 WL) may be included at junctions of the first and second stacks ST1 and ST2. The first stack ST1 may be positioned between the common source line CSL and the first dummy word line Dummy1 WL. The second stack ST2 may be positioned between the second dummy word line Dummy2 WL and the bit line BL.

The first stack ST1 may include a ground selection line GSL, a first edge word line Edge1 WL, and first stack word lines Stack1 WLs. The second stack ST2 may include second stack word lines Stack2 WLs and second edge word lines Edge2 WL. Memory cells connected to the first and second edge word lines Edge1 WL and Edge2 WL may store bit data different from the other memory cells. For example, memory cells connected to the first and second edge word lines Edge1 WL and Edge2 WL may be SLC or MLC, and memory cells connected to the other word lines may be TLC or QLC.

The memory device 3000 may include a scan register circuit. The scan register circuit may obtain information about the scan register where the fail result is stored through a scan operation. The scan register circuit may use the information about the scan register where the fail result is stored to determine the number of fail bits depending on the operation mode or generate a position index indicating the position of the fail bit.

Figure 28:
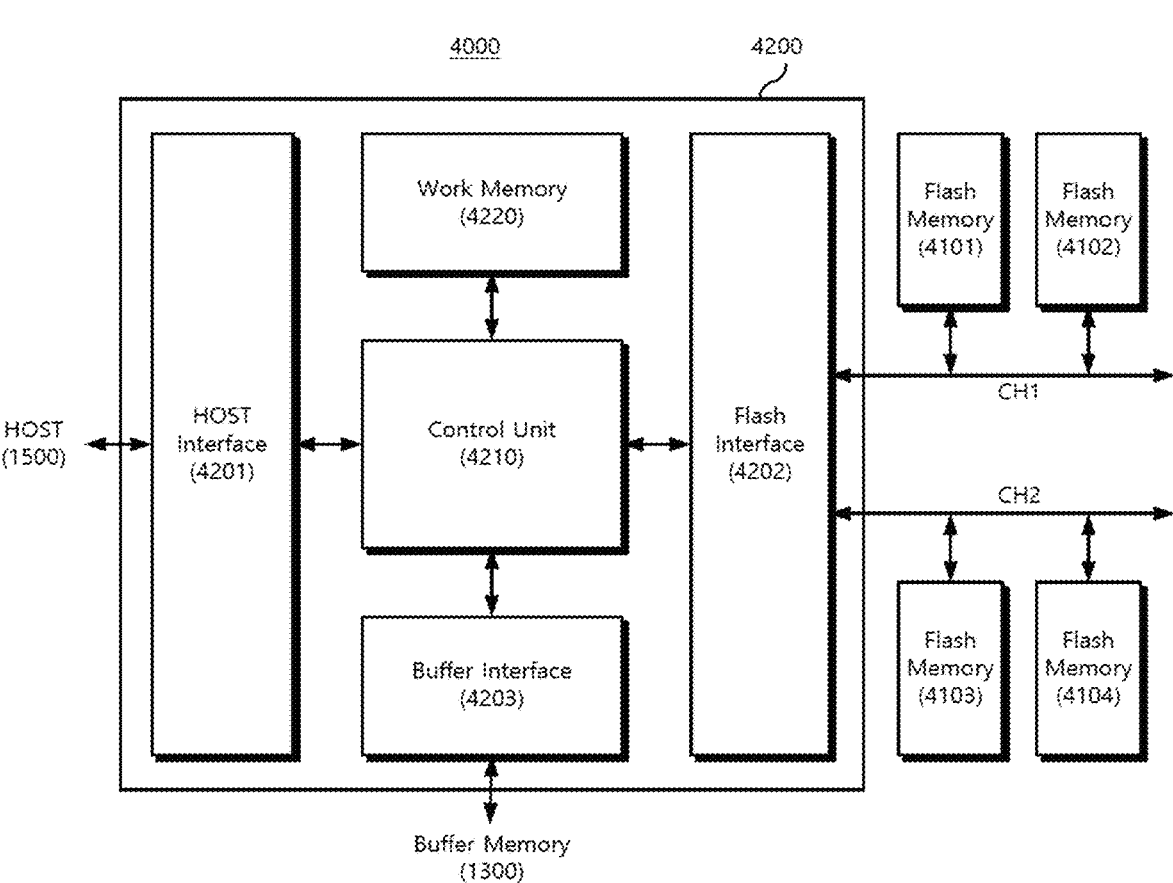
FIG. 28 is a block diagram illustrating an example in which a storage device according to an embodiment of the present disclosure is implemented with a solid state drive (SSD).

FIG. 28 is a block diagram illustrating an example in which a storage device according to an embodiment of the present disclosure is implemented with a solid state drive (SSD). Referring to FIG. 20, an SSD 4000 may include a plurality of memory devices 4101 to 4104 and an SSD controller 4200.

The first and second memory devices 4101 and 4102 may be connected with the SSD controller 4200 through a first channel CH1. The third and fourth memory devices 4103 and 4104 may be connected with the SSD controller 4200 through a second channel CH2. The number of channels connected with the SSD controller 4200 may be 2 or more. The number of memory devices connected with one channel may be 2 or more.

The SSD controller 4200 may include a host interface 4201, a memory interface 4202, a buffer interface 4203, a control unit 4210, and a work memory 4220. The SSD controller 4200 may be connected with a host 1500 through the host interface 4201. Depending on a request of the host 1500, the SSD controller 4200 may write data in the corresponding memory device or may read data from the corresponding memory device.

The SSD controller 4200 may be connected with the plurality of memory devices 4101 to 4104 through the memory interface 4202 and may be connected with a buffer memory 1300 through the buffer interface 4203. The memory interface 4202 may provide data, which are temporarily stored in the buffer memory 1300, to the memory devices through the channels CH1 and CH2. The memory interface 4202 may transfer the data read from the memory devices 4101 to 4104 to the buffer memory 1300.

The control unit 4210 may analyze and process the signal received from the host 1500. The control unit 4210 may control the host 1500 or the memory devices 4101 to 4104 through the host interface 4201 or the memory interface 4202. The control unit 4210 may control operations of the memory devices 4101 to 4104 by using firmware for driving the SSD 4000.

The SSD controller 4200 may manage data to be stored in the memory devices 4101 to 4104. In the sudden power-off event, the SSD controller 4200 may back the data stored in the work memory 4220 or the buffer memory 1300 up to the memory devices 4101 to 4104.

According to the present disclosure, it may be possible to reduce a test time taken to perform the margin read test operation and to perform the margin read test operation in high speed.

The above-described semiconductor device, electronic system, or semiconductor package according to embodiments may be included in various electronic products including display devices, televisions, computers (e.g., laptops), phones (e.g., smartphones), severs, infotainment systems, or the like.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
a memory cell array configured to store data;
a page buffer circuit configured to store data in the memory cell array or read data stored in the memory cell array; and
a scan register circuit configured to receive a pass/fail result of data from the page buffer circuit and store the pass/fail result in a plurality of scan registers,
wherein the scan register circuit obtains information about a scan register among the plurality of scan registers where a fail result is stored through a scan operation, and uses the information about the scan register where the fail result is stored to determine a number of fail bits and/or a position index indicating a position of the fail bits according to an operation mode.

2. The memory device of claim 1,
wherein the scan register circuit includes,
a scan register array configured to have a plurality of scan chain units, each scan chain unit having a plurality of scan registers, each scan register storing the pass/fail result of data; and
a bit counter configured to receive information of a scan register storing a fail result from each scan chain unit and determine the number of fail bits when the operation mode is fail bit count mode.

3. The memory device of claim 2, wherein the scan register circuit further includes a position finder configured to determine a position index indicating the position of the fail bits when the operation mode is position search mode, and wherein the position finder receives information of the scan register in which the fail result is stored and information of the scan register in which a first fail result is stored from each scan chain unit and determines the position index.

4. The memory device of claim 3, wherein each scan chain unit includes, a pulse gate configured to receive a clear pulse and output a clock signal;

a plurality of scan registers connected in series and performing a scan chain operation in response to a clock signal of the pulse gate; and a priority filter configured to receive scan chain operation results from the plurality of scan registers and output a scan chain output signal.

5. The memory device of claim 4, wherein the bit counter includes, a bitwise counter configured to receive the scan chain output signal from the priority filter and generate a bit count output signal; and a count register configured to store bit count results; and an adder configured to calculate a fail bit count using a previous bit count stored in the count register and the bit count output signal of the bitwise count.

6. The memory device of claim 4, wherein each scan chain unit further includes, a scan register output circuit configured to receive information about a scan register storing a fail result from the plurality of scan registers and output a scan register output signal.

7. The memory device of claim 6, wherein the scan register output circuit includes selection circuits connected in series, and generates the scan register output signal from each selection circuit in the position search mode.

8. The memory device of claim 7, wherein the position finder includes, a first encoder configured to receive the scan chain output signal and output a first position index;

a second encoder configured to receive the scan chain register signal and output a second position index; and an adder configured to output the position index using the first position index and the second position index.

9. The memory device of claim 8, wherein the second encoder includes, a priority encoder configured to receive the scan chain register signal and generate a scan register priority signal; and a scan register encoder configured to receive the scan register priority signal and generate the second position index.

10. The memory device of claim 1, wherein the memory device is a flash memory in which memory cells are stacked vertically on a substrate.

11. A scan register circuit of a memory device, comprising:

a scan register array configured to have a plurality of scan chain units, each scan chain unit having a plurality of scan registers, each scan register storing a pass/fail result of data; and a fail bit output circuit configured to determine a number of fail bits and/or a position index indicating a position of fail bits depending on an operation mode, wherein the fail bit output circuit obtains information about a scan register among the plurality of scan registers where a fail result is stored through a scan operation of the plurality of scan registers, and determines the number of fail bits or the position index using the information of the scan register where the fail result is stored.

12. The scan register circuit of claim 11, wherein each scan chain unit includes, a pulse gate configured to receive a clear pulse and output a clock signal;

a plurality of scan registers connected in series and performing a scan chain operation in response to a clock signal of the pulse gate; and a priority filter configured to receive scan chain operation results from the plurality of scan registers and output a scan chain output signal.

13. The scan register circuit of claim 12, wherein the fail bit output circuit includes, a bit counter configured to receive information of a scan register storing a fail result from each scan chain unit and determine the number of fail bits when the operation mode is fail bit count mode.

14. The scan register circuit of claim 13, wherein the bit counter includes, a bitwise counter configured to receive the scan chain output signal from the priority filter and generate a bit count output signal; and a count register configured to store bit count results; and an adder configured to calculate a fail bit count using a previous bit count stored in the count register and the bit count output signal of the bitwise count.

15. The scan register circuit of claim 13, wherein the fail bit output circuit further includes a position finder configured to determine a position index indicating the position of the fail bits when the operation mode is position search mode, and wherein the position finder receives information of the scan register in which the fail result is stored and information of the scan register in which a first fail result is stored from each scan chain unit and determines the position index.

16. The scan register circuit of claim 12, wherein each scan chain unit further includes, a scan register output circuit configured to receive information about a scan register storing a fail result from the plurality of scan registers and output a scan register output signal.

17. The scan register circuit of claim 16, wherein the scan register output circuit includes selection circuits connected in series, and generates the scan register output signal from each selection circuit in position search mode.

18. The scan register circuit of claim 11, wherein the memory device is flash memory.

19. A scan register circuit of a memory device, comprising:

a scan register array configured to have a plurality of scan chain units, each scan chain unit having a plurality of scan registers, each scan register storing a pass/fail result of data;

a bit counter configured to receive a scan chain output signal of each scan chain unit in fail bit count mode and determine a number of fail bits; and a position finder configured to receive the scan chain output signal and a scan register output signal of each scan chain unit in position search mode and determine a position index indicating a position of the fail bit.

20. The scan register circuit of claim 19, wherein each scan chain unit includes, a pulse gate configured to receive a clear pulse and output a clock signal;

the plurality of scan registers connected in series and performing a scan chain operation in response to a clock signal of the pulse gate; and a priority filter configured to receive scan chain operation results from the plurality of scan registers and output a scan chain output signal.

\* \* \* \* \*